United States Patent
Sakamoto et al.

(10) Patent No.: US 9,043,524 B2
(45) Date of Patent: May 26, 2015

(54) INFORMATION PROCESSING APPARATUS, METHOD THEREOF, AND STORAGE MEDIUM

(75) Inventors: Isao Sakamoto, Kawasaki (JP); Hisashi Ishikawa, Urayasu (JP)

(73) Assignee: Canon Kabushiki Kaisha, Tokyo (JP)

(*) Notice: Subject to any disclaimer, the term of this patent is extended or adjusted under 35 U.S.C. 154(b) by 260 days.

(21) Appl. No.: 13/619,603

(22) Filed: Sep. 14, 2012

(65) Prior Publication Data

US 2013/0013838 A1     Jan. 10, 2013

Related U.S. Application Data

(63) Continuation of application No. 12/709,395, filed on Feb. 19, 2010, now Pat. No. 8,300,535.

(30) Foreign Application Priority Data

Feb. 24, 2009 (JP) ................................ 2009-041295
Mar. 17, 2009 (JP) ................................ 2009-064682

(51) Int. Cl.
    *G06F 15/80*     (2006.01)
    *H04L 12/801*     (2013.01)
    *H04L 12/46*     (2006.01)

(52) U.S. Cl.
    CPC ............ *G06F 15/8015* (2013.01); *H04L 47/10* (2013.01); *H04L 12/4637* (2013.01)

(58) Field of Classification Search
None
See application file for complete search history.

(56) References Cited

U.S. PATENT DOCUMENTS

| | | | |
|---|---|---|---|
| 5,822,300 A * | 10/1998 | Johnson et al. | 370/229 |
| 7,369,514 B1 * | 5/2008 | Peng et al. | 370/258 |
| 2003/0076781 A1 * | 4/2003 | Enomoto et al. | 370/229 |
| 2006/0209681 A1 * | 9/2006 | Yamamoto | 370/218 |
| 2006/0209877 A1 * | 9/2006 | Yamamoto | 370/452 |
| 2007/0236605 A1 * | 10/2007 | Saito et al. | 348/512 |
| 2009/0113087 A1 * | 4/2009 | Kohinata et al. | 710/60 |
| 2009/0268747 A1 * | 10/2009 | Kurata et al. | 370/412 |

FOREIGN PATENT DOCUMENTS

| | | |
|---|---|---|
| JP | 06-062026 A | 3/1994 |
| JP | 06-276205 A | 9/1994 |
| JP | 2002-185560 A | 6/2002 |
| JP | 2003-198574 A | 7/2003 |

* cited by examiner

*Primary Examiner* — Hong Cho
(74) *Attorney, Agent, or Firm* — Canon USA Inc. IP Division

(57) ABSTRACT

An information processing apparatus includes a plurality of modules connected in a ring shape via a bus, and each module processes a packet flowing in a single direction on the ring in a predetermined order. The module includes a communication unit for transmitting a packet received from a first direction in the ring via the bus to a second direction, a discrimination unit for discriminating a packet from among the packets received from the first direction as a processing packet to be processed by the module, and a processing unit which is connected with the communication unit one by one and configured to process the processing packet. The communication unit transmits the packet processed by the processing unit at an interval equivalent to processing time or more for a processing packet processed by a module in a latter stage in the predetermined order among packets transmitted by the communication unit to the second direction.

17 Claims, 18 Drawing Sheets

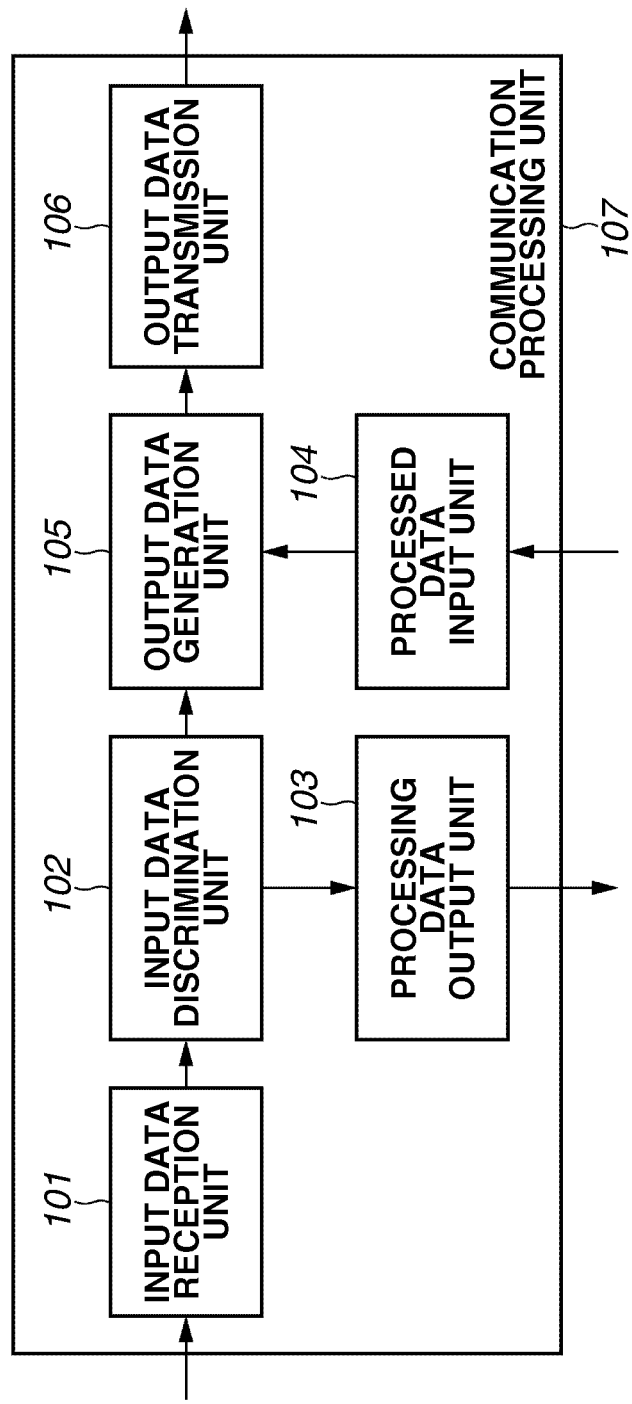

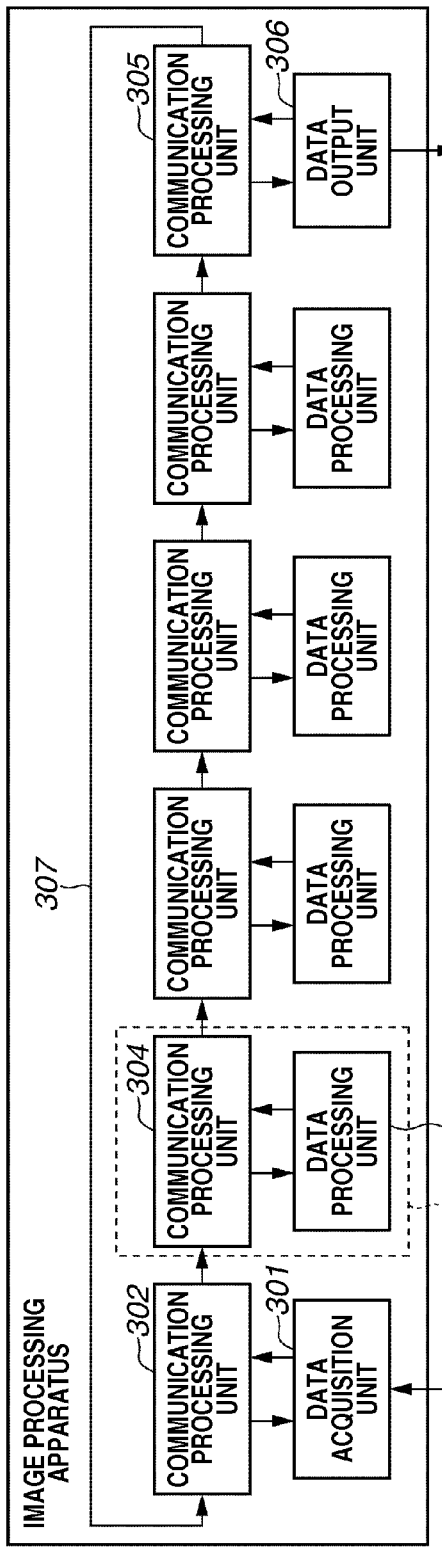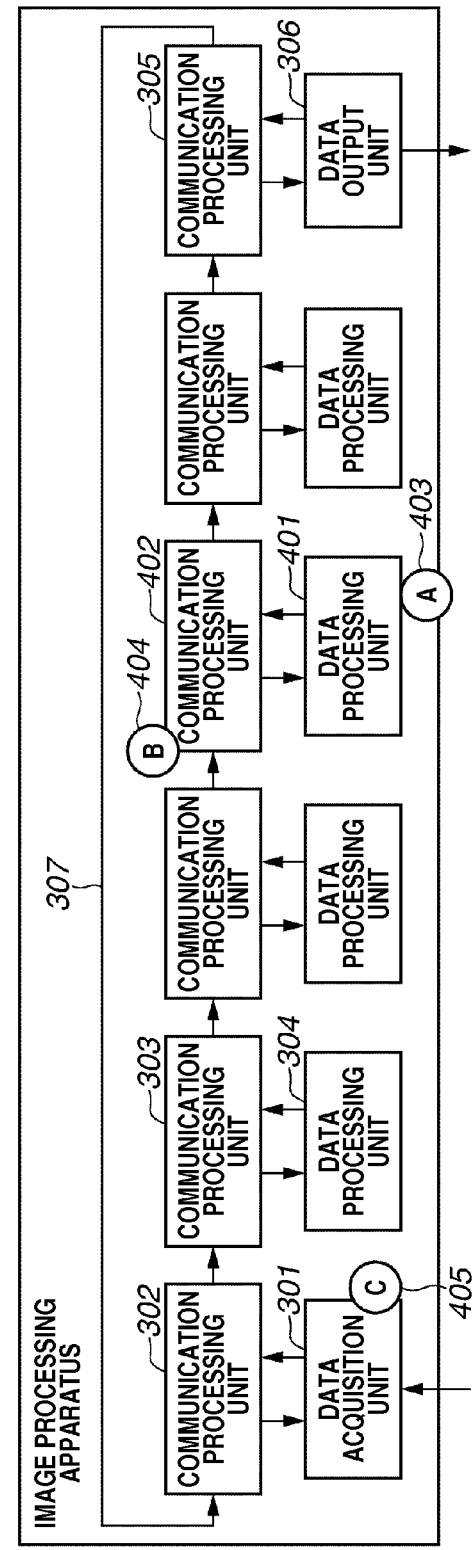

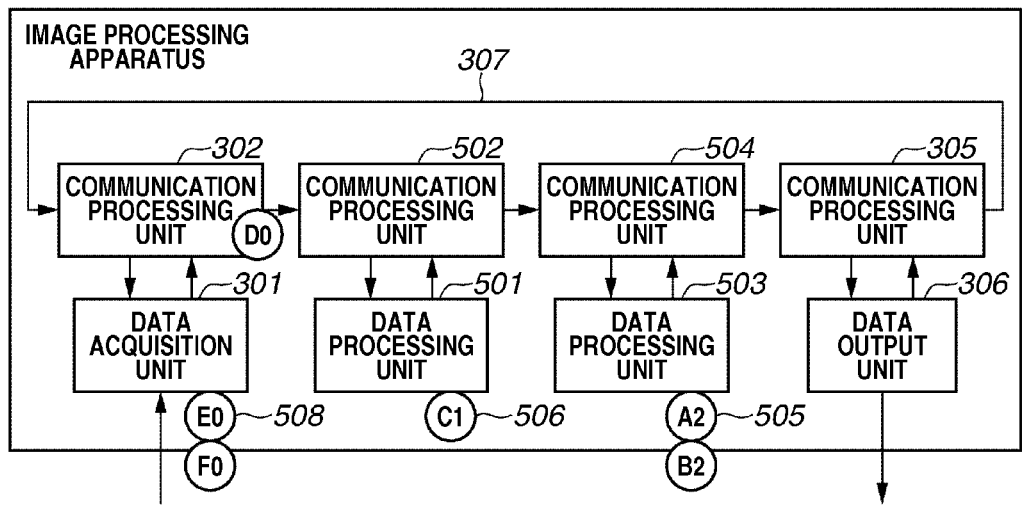
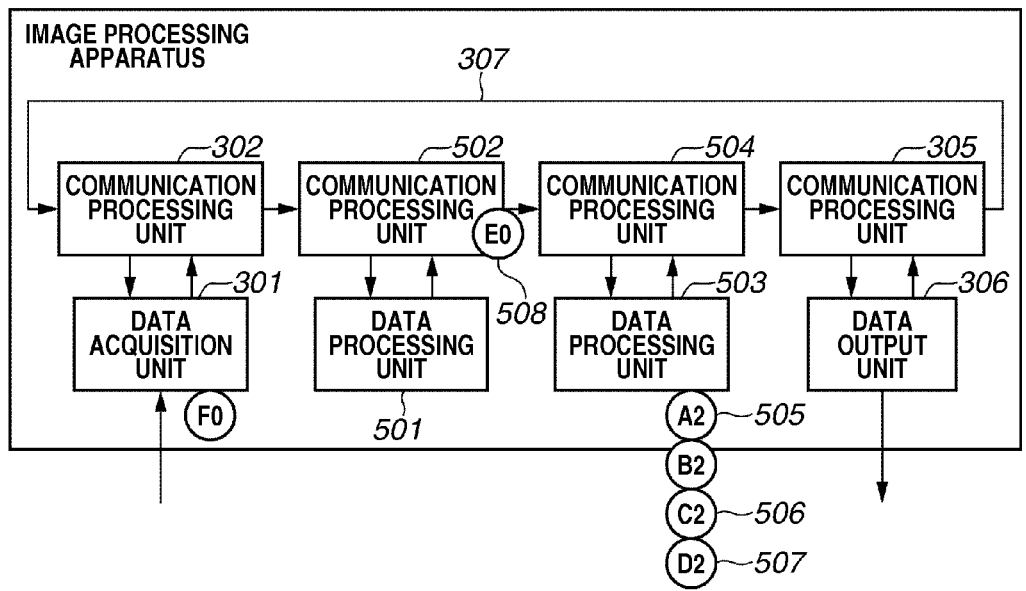

INFORMATION PROCESSING APPARATUS, METHOD THEREOF, AND STORAGE MEDIUM

CROSS-REFERENCE TO RELATED APPLICATIONS

This application is a Continuation of application Ser. No. 12/709,395 filed Feb. 19, 2010 that claims the benefit of Japanese Patent Applications No. 2009-041295 filed Feb. 24, 2009 and No. 2009-064682 filed Mar. 17, 2009, all of which are hereby incorporated by reference in their entirety.

BACKGROUND OF THE INVENTION

1. Field of the Invention

The present invention relates to an information processing apparatus in which a plurality of processing modules is connected to a bus in a ring shape, a method thereof, and a storage medium.

2. Description of the Related Art

In order to realize high-speed pipeline processing, there is a conventional method for dividing a series of data processing corresponding to the pipeline processing, allocating the divided data processing to a plurality of modules, and connecting the modules to a bus according to an order of a flow of the processing.

In order to reduce traffic in the bus when the modules are connected to the bus in a ring shape, there is a method for determining a load on the module for receiving data and restricting data to be received from other processing modules when the load is high.

For example, there is a method in which a module restricts reception of the data from other modules by transmitting a message and deleting and replaying a token to reduce the traffic of the bus (See Japanese Patent Application Laid-Open Nos. 2-283142 and 10-228445).

Japanese Patent No. 2541697 discusses a method in which the data is input at timing not to collide with data circulating in the ring shaped bus to increase an efficiency of an entire processing when the pipeline processing is performed using the modules connected to the ring shaped bus.

However, since techniques discussed in Japanese Patent Applications Laid-Open Nos. 2-283142 and 10-228445 stop a flow of the data in the ring shaped bus, the data to be supplied to the module is also stopped even if other modules can be processed in parallel, so that a processing speed may be decreased as a whole.

When the technique discussed in Japanese Patent No. 2541697 is used for the ring shaped bus, a processing efficiency may be decreased as a whole. One of the reasons is that appropriate timing for supplying the data before all data sets necessary for the processing are obtained is different from that after all the data sets necessary for the processing are obtained.

SUMMARY OF THE INVENTION

According to an aspect of the present invention, an information processing apparatus includes a plurality of modules which are connected in a ring shape via a bus and each module processes a packet flowing in a single direction on the ring in a predetermined order. The module includes a communication unit configured to transmit a packet which is received from a first direction in the ring via the bus to a second direction therein, a discrimination unit configured to discriminate a packet from among the packets received from the first direction as a processing packet to be processed by the module, and a processing unit which is connected with the communication unit one by one and configured to process the processing packet discriminated by the discrimination unit. The communication unit transmits the packet processed by the processing unit at an interval equivalent to processing time or more for a processing packet processed by a module in a latter stage in the predetermined order among a plurality of packets which is transmitted by the communication unit to the second direction.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates an example of a schematic configuration of a communication processing unit in a ring-shaped bus.

FIGS. 3A and 3B illustrate schematic configurations of an image processing apparatus including processing units connected to a ring bus.

FIGS. 4A and 4B illustrate operational states of a data flow.

DESCRIPTION OF THE EMBODIMENTS

Figure 2A:
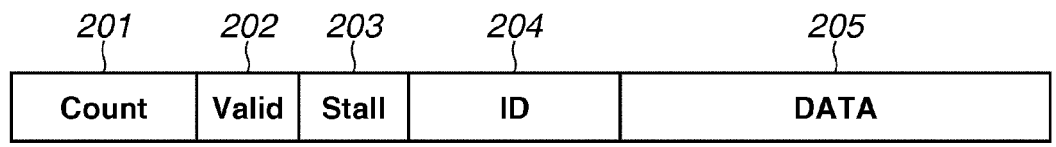
FIGS. 2A and 2B illustrate an example of a format of a packet.

Various exemplary embodiments, features, and aspects of the invention will be described in detail below with reference to the drawings.

In an information processing apparatus in which a plurality of information processing units are connected in a ring shaped bus, and when a processing speed is decreased will be described as an example (hereafter a ring shaped bus is referred to as a "ring bus").

FIG. 1 illustrates a configuration of a communication processing unit which connects a communication path (hereafter referred to as a "bus") and an information processing unit (hereafter, referred to as a "data processing unit"). An input data reception unit 101 receives a data packet flowing in the ring bus. An input data discrimination unit 102 checks control information included in the input data packet and discriminates whether the input data is to be processed by an own node.

A processing data output unit 103 transmits to the data processing unit the data determined by the input data discrimination unit 102 to be processed by the own node. A processed data input unit 104 receives data input processed by the data processing unit in the own node.

An output data generation unit 105 generates output data from the data which is determined by the input data discrimination unit 102 as the data not to be processed by the own node, an empty packet which is determined not including valid data, the processed data which is transmitted from the processed data input unit 104 and necessary to be output to the bus, and the like. An output data transmission unit 106 outputs to the ring bus the output data generated by the output data generation unit 105.

Figure 2B:
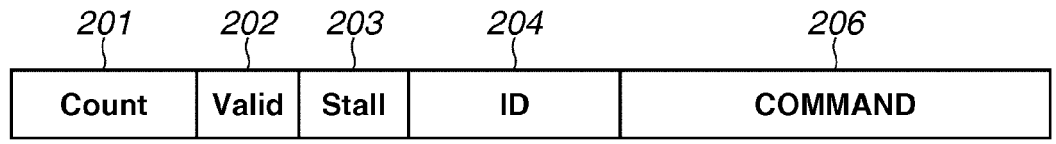

FIGS. 2A and 2B illustrate data configurations of packets to be transmitted and received by the ring bus of the data communication processing unit.

A field 201 includes a counter indicating an order for processing the data. A part of the data packet including sequential unprocessed data may circulate in a ring shaped data bus. Thus, the data received by the communication processing unit is not always the data to be firstly processed by a corresponding data processing unit. If the data has such a counter, the processing can be performed according to a correct processing order. The corresponding data processing unit refers to the data processing unit with which the communication processing unit can communicate without using the ring bus.

A field 202 includes a flag indicating that the data stored in the data packet is valid data to be processed. In other words, the flag indicates whether the packet is currently in use. Hereafter, the flag is referred to as a valid bit. A field 203 includes a flag indicating that the data stored in the packed is not received by the data processing unit which is to process the data for some reasons. The field 203 has a same meaning as that of a data supply stop request bit (disable signal) to a previous stage in a normal pipeline connection. Hereafter, the field 203 is referred to as a stole bit.

A field 204 includes an identification (ID) of the data processing unit that has lastly processed the data. The data communication processing unit compares a stand-by ID previously set from an external unit with the ID of the data packet, and performs the processing when the IDs correspond with each other. A field 205 stores the data.

A total number of the packets flowing in the ring bus is substantially constant. More specifically, a sum of empty packets and valid packets is substantially constant, and the constant number of packets continuously circulate in the ring bus. The empty packet stores the data determined to be invalid, and the valid packet stores the data or the command.

FIG. 3A illustrates a configuration of the image processing apparatus in which the bus is constituted in a token passing method.

A data acquisition unit 301 acquires the data to be processed from an external storage apparatus. An input communication processing unit 302 supplies the acquired data into the ring bus. A data processing unit 303 performs a predetermined processing on the supplied data. Normally, the processing unit is not set in a standalone status in which the processing unit does not communicate with the external units during processing information. That is because a mass-storage circuit is provided outside the processing unit and a high speed small capacity storage circuit is provided inside the processing unit. In this specification, in order to describe communication processing to be performed by the processing unit in detail, the data processing unit and the communication processing unit are described independently from the processing unit. It is assumed that each data processing unit is paired with a corresponding communication processing unit.

A communication processing unit 304 selects and acquires the data (processing packet) to be processed by the data processing unit 303 from the ring bus. In this configuration, one or more processing units 308 (module) including the data processing unit 303 and the communication processing unit 304 are connected to a ring bus 307.

An output communication processing unit 305 selects and acquires the processed data from the ring bus to output the processed data to the external storage apparatus. A data output unit 306 outputs the processed data acquired by the output communication processing unit 305 to the external storage apparatus. The ring bus 307 is a ring shaped data bus which communicably connects the communication processing units described above.

FIG. 3B illustrates a state where the processing speed is decreased in the configuration illustrated in FIG. 3A.

It is assumed that the ring bus transmits a piece of data to a following communication processing unit per unit time (hereafter, referred to as a "cycle"). When three cycles elapse after a piece of data is received, a data processing unit 401 can transmit processed result data. During the processing, the data processing unit 401 cannot receive next data.

A communication processing unit 402 acquires, from the ring bus, the data to be processed by the data processing unit 401 corresponding to the communication processing unit 402. While the data processing unit 401 is processing first data 403, if second data 404 is input to the communication processing unit 402 corresponding to the data processing unit 401, the communication processing unit 402 does not transmit the second data 404 to the data processing unit 401 but transmits the data 404 to a next processing unit in a following cycle, or deletes the data 404 and notifies the data acquisition unit 301 of a resend request. If the second data 404 merely circulates in the ring bus, the second data 404 needs a number of cycles corresponding to a number of communication processing units connected to the ring bus to return to the communication processing unit 402.

In the configuration illustrated in FIG. 3B, since six communication processing units are connected to the ring bus, the data 404 needs time for six cycles to return to the communication processing unit 402. The data processing unit 401 completes the processing in three cycles, outputs the first data 403, and becomes a stand-by status for the following data. Thus, a delay time of 6−3=3 cycles, at least, is generated. Further, if the delay occurs with all input data sets following third data, when a total of input data sets is defined as "N", basically, the data processing unit 401 can process one piece of data in three cycles and thus the processing is completed in 3N cycles. However, if the delay time of three cycles is generated for each data, 6N cycles, which are double, are necessary.

When the technique discussed in Japanese Patent Application Laid-Open No. 2-283142 is applied to the image processing apparatus, the data 404 which has not been received is deleted by the communication processing unit which could not transmit the data to the data processing unit. The data acquisition unit 301 from which the data is supplied checks that the data 404 does not return within a predetermined time period, and then transmits the data once again.

According to the technique discussed in Japanese Patent Application Laid-Open No. 2-283142, however, when data 405 following the data 404 has been already acquired or transmitted, it is necessary to acquire data to be read from the external unit again by going back to the data which have been already transmitted, so that access to the external unit increases.

When the technique discussed in Japanese Patent Application Laid-Open No. 10-228445 is adopted, a content of the data 404 which is not received by the communication processing unit 402 is discarded, and the data 404 is flown to the ring bus as a token notifying that the data has not been received.

According to the technique discussed in Japanese Patent Application Laid-Open No. 10-228445, when an operation for acquiring the data to be transmitted again is performed after the notification token is received, the delay time can be further increased.

Japanese Patent No. 2541697 discusses a technique in which the following data can be supplied from an input end at timing for avoiding collision with another data in the ring bus even while previous data is being processed.

According to Japanese Patent No. 2541697, however, when the data processing unit operates a plurality of pieces of data, it is estimated that an output is determined by the data input with the same timing. When the plurality of pieces of data need to be received to generate the output data, processing speed can be further decreased if a number of buses corresponding to a number of pieces of the data to be received is not prepared, which will be described below.

The technique discussed in Japanese Patent No. 2541697 will be described in detail below referring to FIGS. 4A and 4B. FIGS. 4A and 4B illustrate an apparatus provided with two data processing units which have a similar configuration to that illustrated in FIGS. 3A and 3B. In the apparatus, it is assumed that a data processing unit 501 and a data processing unit 503 sequentially perform processing on data, then the data processing unit 501 performs the processing once again, and acquire a result. The data processing unit 501 needs three cycles to perform the processing on one piece of data and output the data. The data processing unit 503 outputs the data every three cycles after four pieces of data have been input. Alphabets attached to data 505, 506, 507, and 508 illustrated in FIGS. 4A and 4B indicate orders that the data is input into the apparatus, and a numeral next to the alphabet indicates a number of pieces of data processed by the data processing unit.

In this case, until the data processing unit 503 illustrated in FIG. 4A receives fourth data 507, the data processing unit 503 can effectively perform the processing on the data by inputting the data from the data acquisition unit 301 at a certain interval in which the data can be received. However, as illustrated in FIG. 4B, when further three cycles elapse after the fourth data 507 which is to be output is received by the data processing unit 503, the data 505 can be output. At this point, if data 508 has been input into the apparatus and completed the processing by the data processing unit 501, and if the data 507 is not output from the data processing unit 503, the data 508 is to circulate in the ring bus.

In the technique discussed in Japanese Patent No. 2541697, in order to enable the data processing unit 503 to receive all pieces of the data, the processing time of the data processing unit 503 needs to include time for completing the processing on four sets of data. More specifically, since an interval for inputting the data from the data acquisition unit 301 needs to be 3×4=12 cycles or more, at least, with which the data processing unit 503 can receive following data, the processing cannot be efficiently performed when the data processing unit 503 illustrated in FIG. 4A receives four sets of data to be output.

An image processing apparatus according to a first exemplary embodiment of the present invention will be described below. Components which have same functions as those of the reference example are denoted in the same reference numerals. Descriptions about components which have similar configurations or functions will not be repeated. The present exemplary embodiment uses a communication method different from a token passing method, and thus a token packet does not need to be used.

Figure 11:
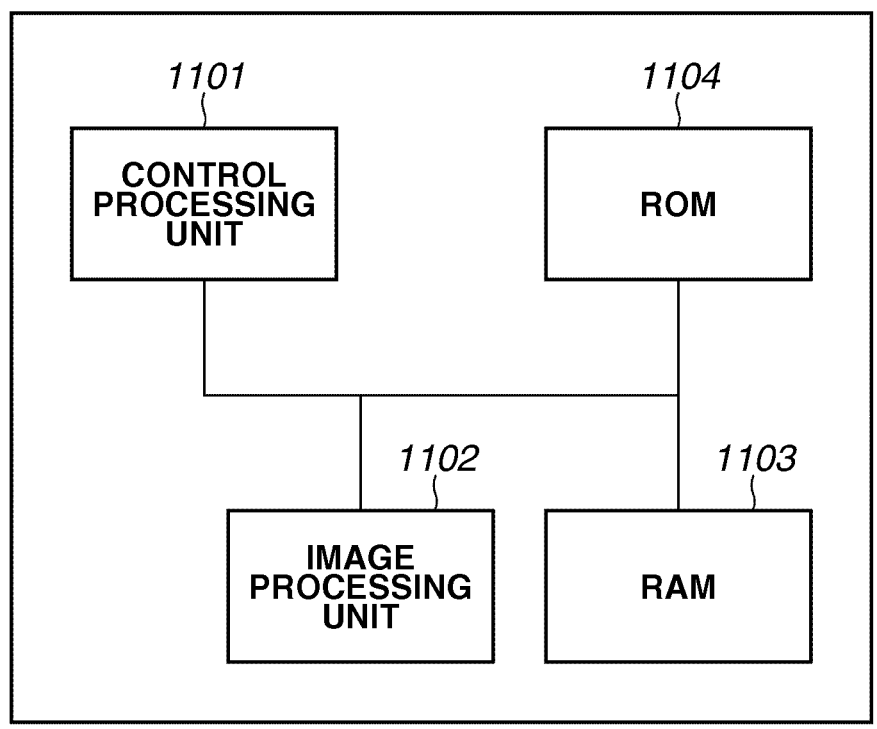
FIG. 11 illustrates a schematic configuration of the image processing apparatus.

FIG. 11 illustrates a schematic configuration of the image processing apparatus according to the first exemplary embodiment of the present invention. A control processing unit 1101 may include a processing circuit such as a central processing unit (CPU) or a micro processing unit (MPU). An image processing unit 1102 includes a plurality of processing units connected to the ring bus.

A random access memory (RAM) 1103 is a readable/writable memory, and stores input image data before being processed, output image data after being processed, data for setting parameter of the image processing unit 1102, or the like. A read only memory (ROM) 1104 is a readable memory which can store processing procedures, and constants of setting parameters of the control processing unit 1101 and the image processing unit 1102.

According to a program read from the ROM 1104, the control processing unit 1101 controls a system and issues an instruction to the image processing unit 1102. The image processing unit 1102 performs image processing according to the instruction from the control processing unit 1101. At that time, input image data previously stored in the RAM 1103 is read to perform the processing, and a processing result is input to the RAM 1103.

Figure 12:
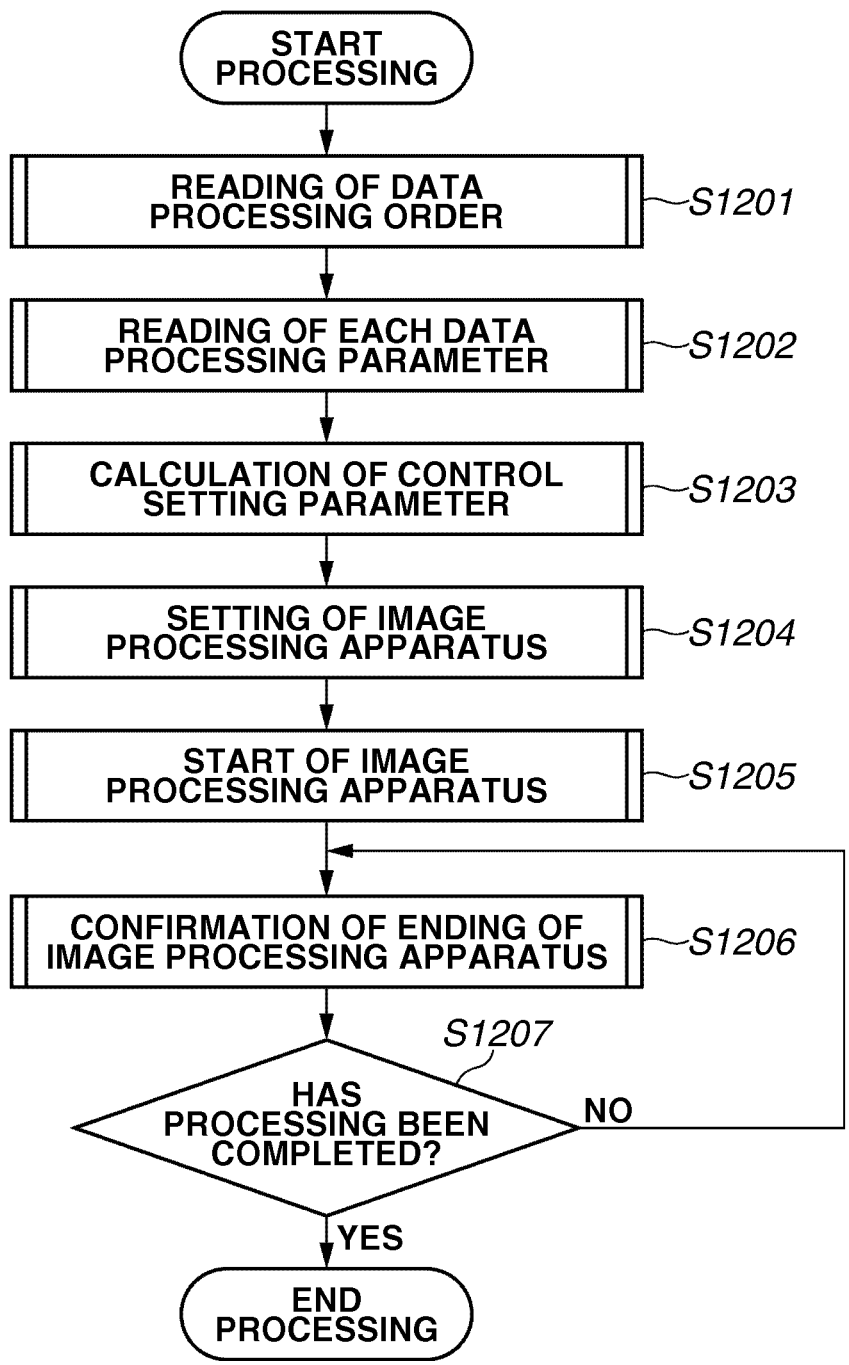
FIG. 12 is a flowchart illustrating a flow of processing for setting the image processing unit by a control processing unit.

FIG. 12 illustrates a flow of a processing for setting the image processing unit 1102 by the control processing unit 1101. When the image processing control is started, the processing is performed according to following steps. In step S1201, the control processing unit 1101 reads from the ROM 1104 an order of the processing performed by the data processing unit in the image processing unit 1102. In step S1202, the control processing unit 1101 reads a processing parameter to be given from the ROM 1104 to the data processing unit. In step S1203, the control processing unit 1101 calculates a control parameter of the image processing unit 1102 by using the read data processing order and the read processing parameter.

In step S1204, the control processing unit 1101 performs setting of the image processing unit 1102 using the control parameter calculated in step S1203. In step S1205, the control processing unit 1101 instructs the image processing unit 1102 to start the processing. In step S1206, the control processing unit 1101 checks whether the setting of the image processing unit 1102 is completed.

In step S1207, the setting is determined to be completed (YES in step S1207), the processing ends. When the setting is not completed (NO in step S1207), the processing returns to step S1206 to continue the processing for checking the completion.

The image processing unit 1102 of the present exemplary embodiment has a schematic configuration similar to those illustrated in FIGS. 3A and 3B.

According to the present exemplary embodiment, as illustrated in FIGS. 3A and 3B, the modules including the communication processing unit and the data processing unit are pipeline-connected to be performed in parallel. Further, both ends of the modules are connected to the ring shaped bus.

In such a ring bus, as illustrated by a packet 801, a limited number of conceptual packets which store the data exist in the ring. The packet stores the data to be processed and circulates in a single direction to transfer the data to the desired data processing unit. In the present exemplary embodiment, the packet has the format illustrated in FIGS. 2A and 2B.

Each communication processing unit compares the ID previously set to the register stored therein with the ID added to the data in the packet. When the IDs are identical, the communication processing unit acquires the data of the packet. Subsequently, the data processing unit processes the data of the packet. The processed data is transmitted from the data processing unit to the communication processing unit. The communication processing unit stores the processed data and a new ID in an empty packet which does not store any data and outputs the data to the bus. Each communication unit performs such processing described above to perform a series of pipeline processing in an intended order.

Further, in order to change types of the processing performed by the image processing apparatus, the processing illustrated in FIG. 12 is performed again. The orders of the processing units to be used for the pipeline processing and processing contents of each processing unit can be readily changed.

Figure 5:
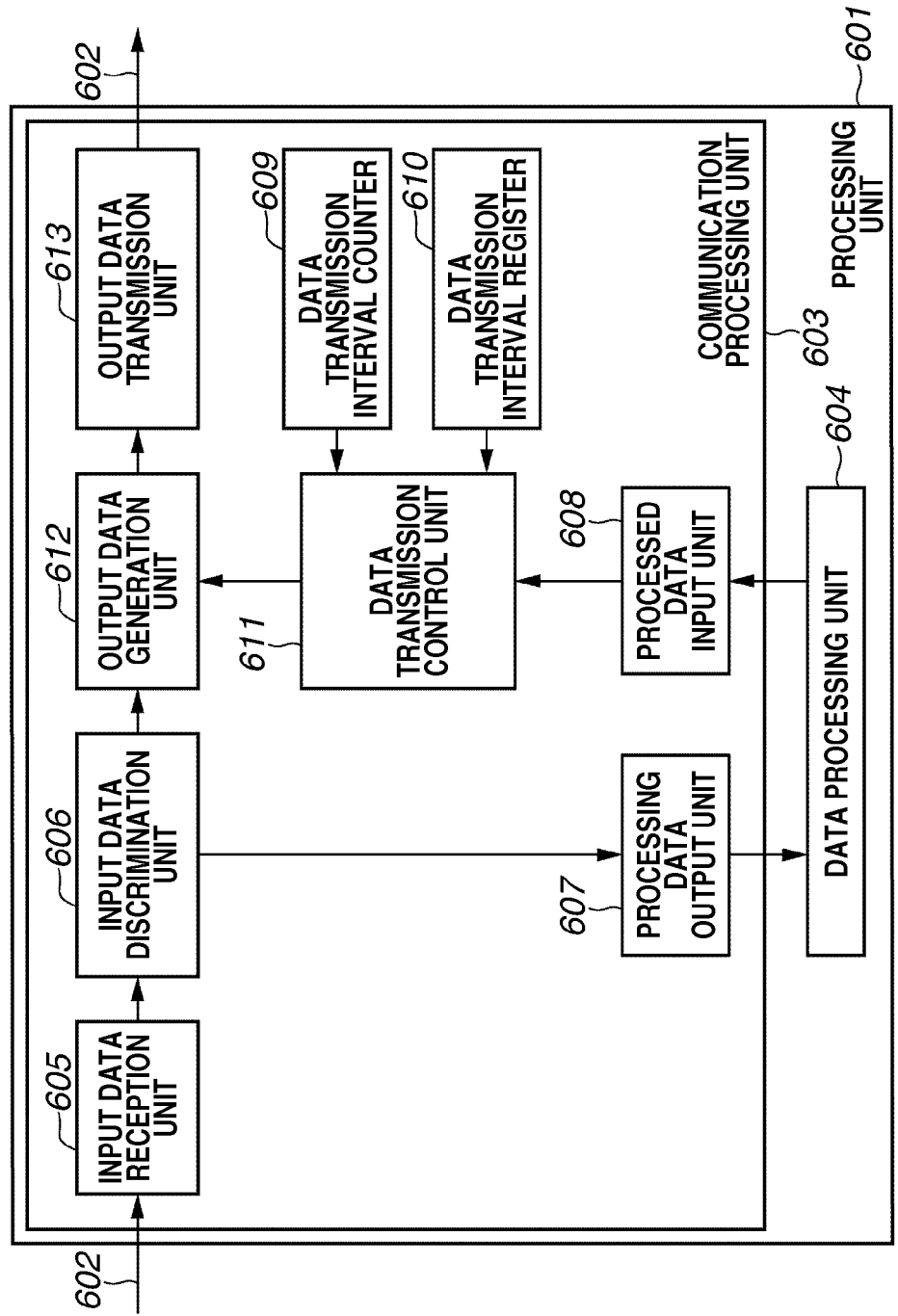
FIG. 5 illustrates a schematic configuration of the processing unit of the image processing apparatus.

FIG. 5 illustrates a schematic configuration of a processing unit 601 included in the image processing apparatus according to the present exemplary embodiment. A ring bus 602 communicably connects various units included in the processing unit 601. A communication processing unit 603 communicates with other processing units via the ring bus. A data processing unit 604 processes the data received from the communication processing unit 603 using allocated algorithm. An input data reception unit 605 receives a data packet flowing in the ring bus (more specifically, packet from the communication processing unit on a first direction). An input data discrimination unit 606 checks the packet received by the input data reception unit 605, and determines whether the data stored in the packet is to be processed by the own node and whether the packet is valid. A processing data output unit 607 extracts the data and a command included in the packet that the input data discrimination unit 606 determines to process by the own node, and outputs the data to the data processing unit 604.

A processed data input unit 608 receives the data and the command input from the data processing unit 604. A data transmission interval counter 609 stores a value relating to an interval from the last data has been transmitted. A data transmission interval register 610 stores a value relating to an interval for transmitting the data. A data transmission control unit 611 controls an interval for transmitting the data received from the processed data input unit 608 to an output data generation unit 612 to become a set value of the data transmission interval register 610 or more.

The output data generation unit 612 generates the transmission packet from the input data which the input data discrimination unit 606 determines not to be processed by the own node and the data transmitted from the data transmission control unit 611. The output data generation unit 612 stores the data in an empty packet and validate the data to generate the transmission packet. An output data transmission unit 613 transmits the transmission packet generated by the output data generation unit 612 into the bus (more specifically, to the transmission processing unit on a second direction).

According to the present exemplary embodiment, the packet circulating in the ring bus 602 has the format illustrated in FIGS. 2A and 2B. A format of the ID to be stored in the field 204 is not limited as long as the ID can satisfy purposes that the data packet is transferred between the data processing units in a desired order and the command packet is transferred to a desired data processing unit.

Therefore, for example, a combination of identifiers of a sender and a recipient of the packet can be allocated for the ID to be stored in the field 204 instead of the ID of the last data processing unit which has processed the data. Further, the data packet and the command packet may have different formats of the ID to be stored in the field 204.

Figure 6:
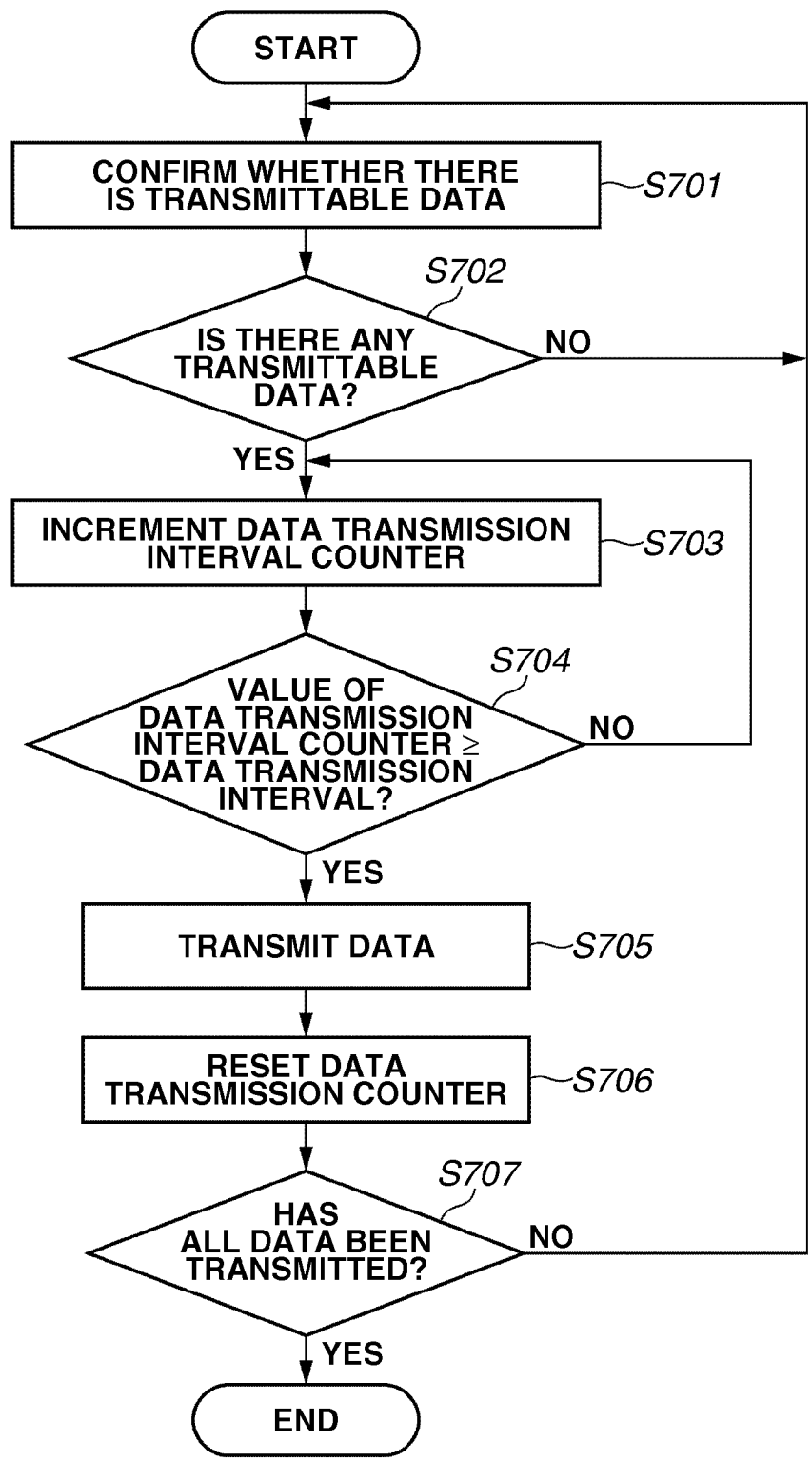
FIG. 6 is a flowchart illustrating a flow of processing performed by a data transmission control unit.

The control processing for transmitting the data performed by the data transmission control unit 611 will be described below referring to a flowchart illustrated in FIG. 6. In step S701, the data transmission control unit 611 checks whether there is any transmittable data in the processed data input unit 608. In step S702, when there is no transmittable data in the processed data input unit 608 (NO in step S702), the data transmission control unit 611 repeats the processing in steps S701 and S702. When there is the transmittable data in the processed data input unit 608 (YES in step S702), in step S703, the data transmission control unit 611 increments the data transmission interval counter 609. In step S704, the data transmission control unit 611 compares a value of a counter of the data transmission interval counter 609 with a value of the data transmission interval register 610.

By comparing the values, the data transmission control unit 611 repeats the processing in steps S703 and S704 until the value of the data transmission interval register 610 becomes more than the value of the data transmission interval counter 609. In step S704, if it is determined that the interval set in the data transmission interval register 610 has elapsed (YES in step S704), then in step S705, the data is transmitted. In step S706, the data transmission control unit 611 resets the value of the data transmission interval counter 609.

In step S707, the data transmission control unit 611 checks whether all pieces of data in a series to be processed has been processed. When not processed (NO in step S707), the processing is repeated from step S701. The series of data to be processed may be image data of one page, or one block of a plurality of blocks which are divided from the data of the one image.

The data transmission interval register 610 stores, as a transmission interval, a value indicating an interval at which a setting target processing unit transmits a packet which is likely to be processed by a following processing unit. The transmission interval indicates an interval longer than processing time of the following processing unit, and is preferably as short as possible.

The processing time is defined as time conceptually necessary for the processing unit to supply one packet, to complete the processing on the packet according to the allocated algorithm, and to become a state ready for receiving a next data. For example, the processing time of the processing unit which receives two packets and transmits one packet is regarded as a half of a time period from receiving two packets to completing transmission of one packet. On the other hand, the processing time of the processing unit which receives one packet and transmits two packets is regarded as a time period from receiving one packet to completing transmission of two packets. In the present exemplary embodiment, according to the above described setting of the processing unit, the processing unit which cannot receive the following packet during the processing can transmit an amount of the packets which can be processed. Thus, the traffic in the bus can be optimized.

The transmission interval largely depends on performance of each data processing unit and a type of processing to be performed. Referring to the flowchart illustrated in FIG. 12, a method in which the control processing unit 1101 sets the transmission interval of each processing unit will be described below. More specifically, the transmission interval of the processing unit is set to the processing time per packet of a following processing unit next to the processing unit in a processing order or longer.

Therefore, it is desirable that the control processing unit 1101 sets the transmission interval from the last processing unit to the first processing unit in the inverse order. According to the present exemplary embodiment, since the data output unit 306 is not the processing unit, the processing time does not need to be considered. However, the total sum of time for receiving and transmitting a packet in the data output unit 306 may be considered as the processing time.

As described above, according to the first exemplary embodiment, among the packets transmitted by the processing units, the packet to be processed by the processing unit in a latter stage is transmitted at the interval equivalent to or more than the processing time for each packet by the processing unit in the latter stage. Thus, the data to be output to the ring bus is narrowed down to the data necessary for being processed, so that data can be effectively circulated. Since the packet not to be processed in the processing unit in the latter stage is not subjected to this restriction, the packet flow in the ring bus is not disturbed.

The data processing unit 303, the data acquisition unit 301, and the data output unit 306 may perform the processing based on the command packet acquired from the ring bus. In this case, since the data and the command can be supplied to the data processing unit via a single bus by shifting time, the bus can be physically reduced, and a circuit of the information processing apparatus can be downsized.

Figure 7:
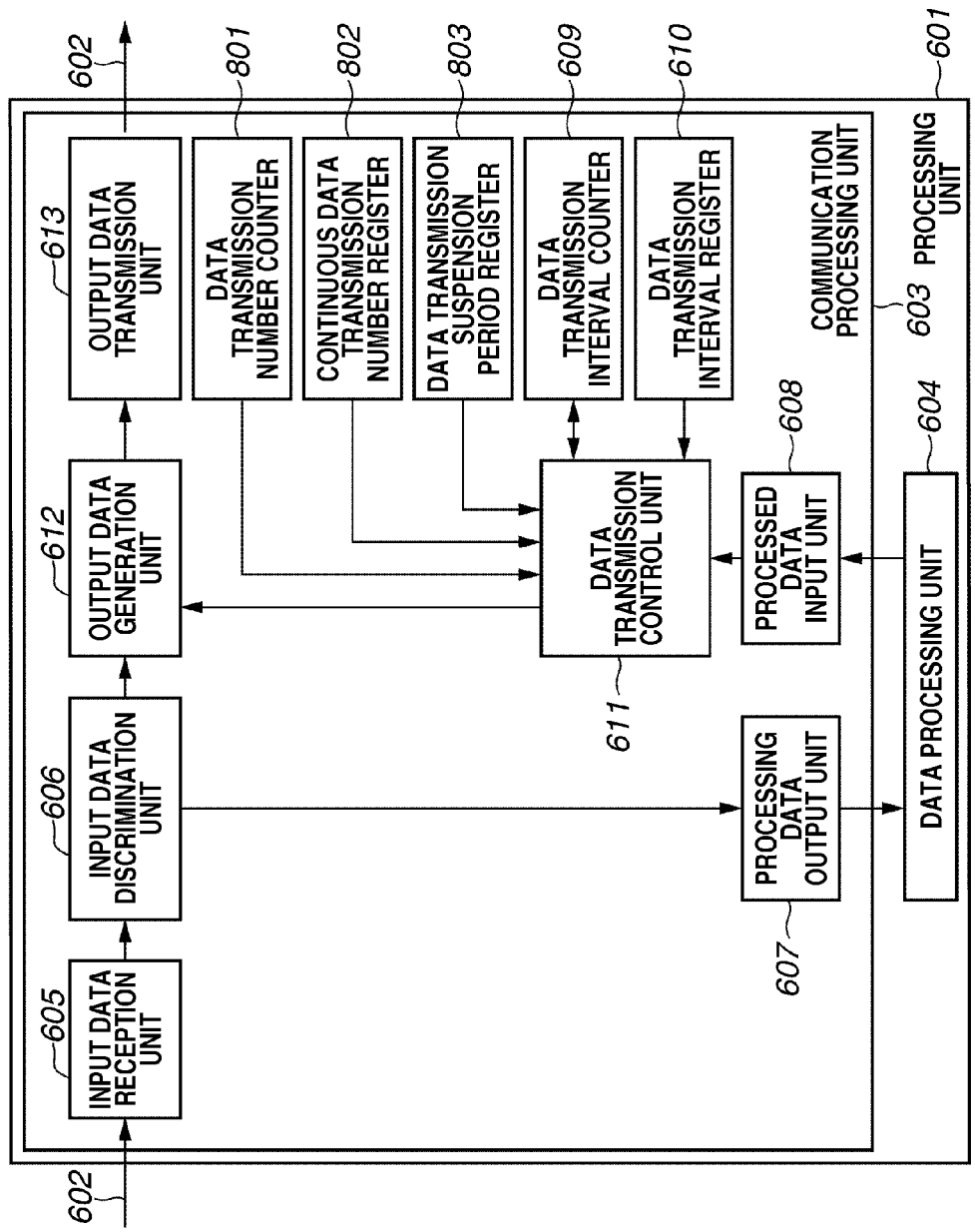
FIG. 7 illustrates a schematic configuration of the processing unit of the image processing apparatus.

FIG. 7 illustrates another exemplary embodiment of the communication processing unit. In the configuration illustrated in FIG. 7, every time the data processed by the processing unit is transmitted a number of data transmissions (a first amount of data), the communication processing unit restricts the transmission of the data processed by the processing unit during a predetermined suspension time period (corresponding to transmitting a second amount of data). Components and processes which have same functions as those illustrated in FIG. 5 are denoted in the same reference numerals. Descriptions about components and processes which have similar configurations or functions will not be repeated.

In FIG. 7, a data transmission number counter 801 stores a number of transmissions of the data processed in the data processing unit 604. The number of transmissions of the data is equivalent to a number of transmitted packets. A continuous data transmission number register 802 stores a number of sequential transmissions of the data.

A data transmission suspension period register 803 stores a value indicating a time period when the transmission of the data is restricted after a number of pieces of the data set to the continuous data transmission number register 802 is transmitted. The data transmission control unit 611 controls the transmission of the data based on the values set to the data transmission number counter 801, the continuous data transmission number register 802, and the data transmission suspension period register 803.

Figure 8:
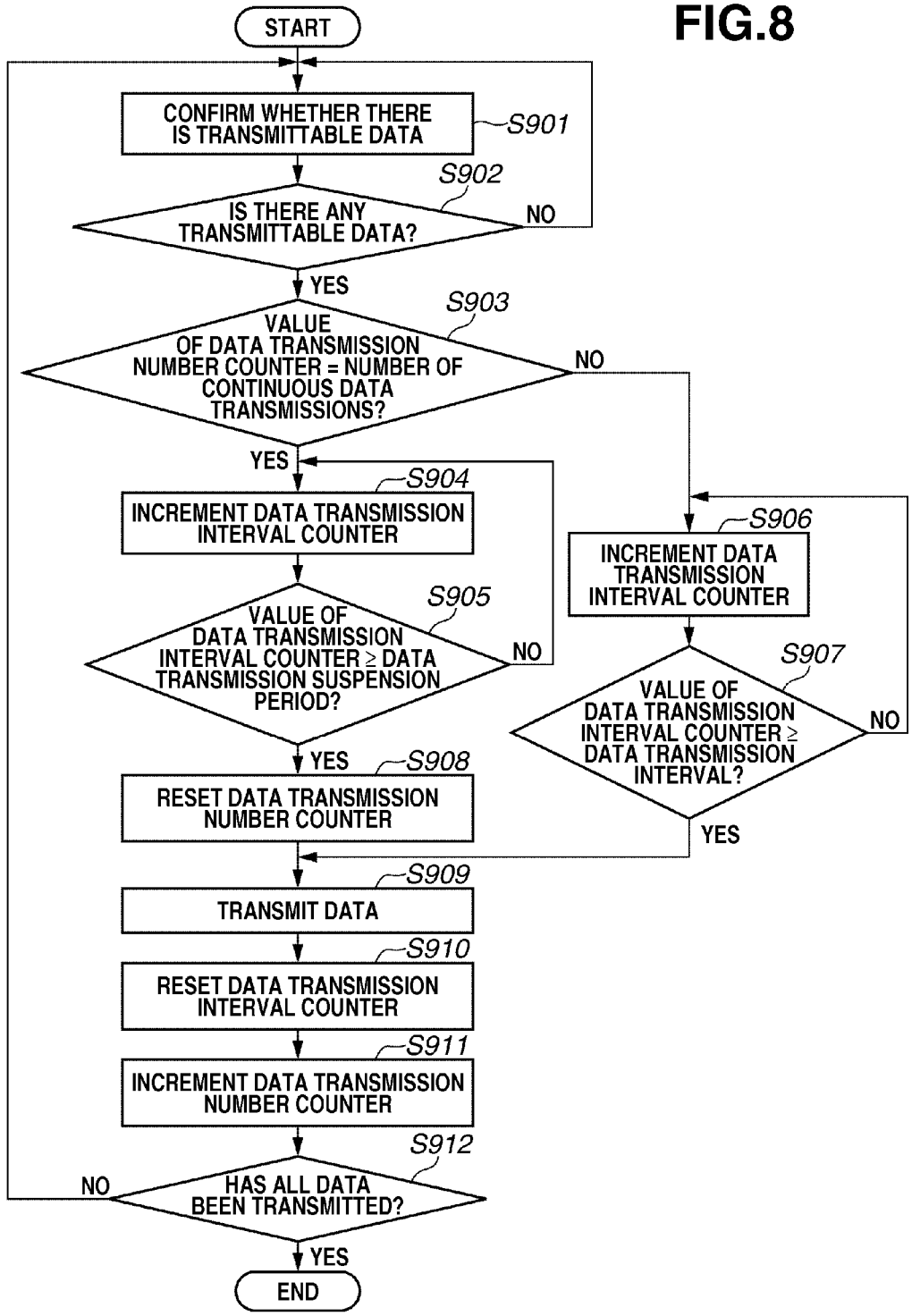
FIG. 8 is a flowchart illustrating a flow of the processing performed by the data transmission control unit.

The control processing performed by the data transmission control unit 611 in the configuration illustrated in FIG. 7 will be described below referring to a flowchart illustrated in FIG. 8. In step S901, the data transmission control unit 611 checks whether there is any transmittable data in the processed data input unit 608. In step S902, when there is no transmittable data in the processed data input unit 608 (NO in step S902), the data transmission control unit 611 repeats the processing in steps S901 and S902. When there is transmittable data (YES in step S902), in step S903, the data transmission control unit 611 determines whether a value of the data transmission number counter 801 is equal to a value of the continuous data transmission number register 802.

When the values are equal (Yes in step S903), in step S904, the data transmission control unit 611 increments a value of the data transmission interval counter 609, and repeats the processing in steps S904 and S905 until the data transmission suspension time period elapses which is set when the last data transmission is completed. When the set data transmission suspension time period elapses, in step S908, the data transmission control unit 611 resets the data transmission number counter 801 to zero.

When the values are not equal (NO in step S903), in step S906, the data transmission control unit 611 increments the value of the data transmission interval counter 609. Then in step S907, the data transmission control unit 611 compares the value of the data transmission interval counter 609 with the value set to the data transmission interval register 610. The data transmission control unit 611 repeats the processing in steps S906 and S907 until the value of the data transmission interval counter 609 becomes the value of the data transmission interval register 610 or more.

When time of the data transmission interval or more elapses in step S907, or when step S908 is completed, then in step S909, the data transmission control unit 611 transmits the data. When the data is transmitted, in step S910, the data transmission control unit 611 resets the data transmission interval counter 609. In step S911, the data transmission control unit 611 increments the value of the data transmission number counter 801. In step S912, the data transmission control unit 611 checks whether all pieces of data in a series to be processed has been processed. When not processed (NO in step S912), the processing is repeated from step S901.

As described above, the time period for suspending the transmission is provided after a predetermined number of pieces of data is sequentially transmitted, so that an amount of the data flowing in the ring bus may be restricted not to increase to deteriorate processing performance.

Figure 9:
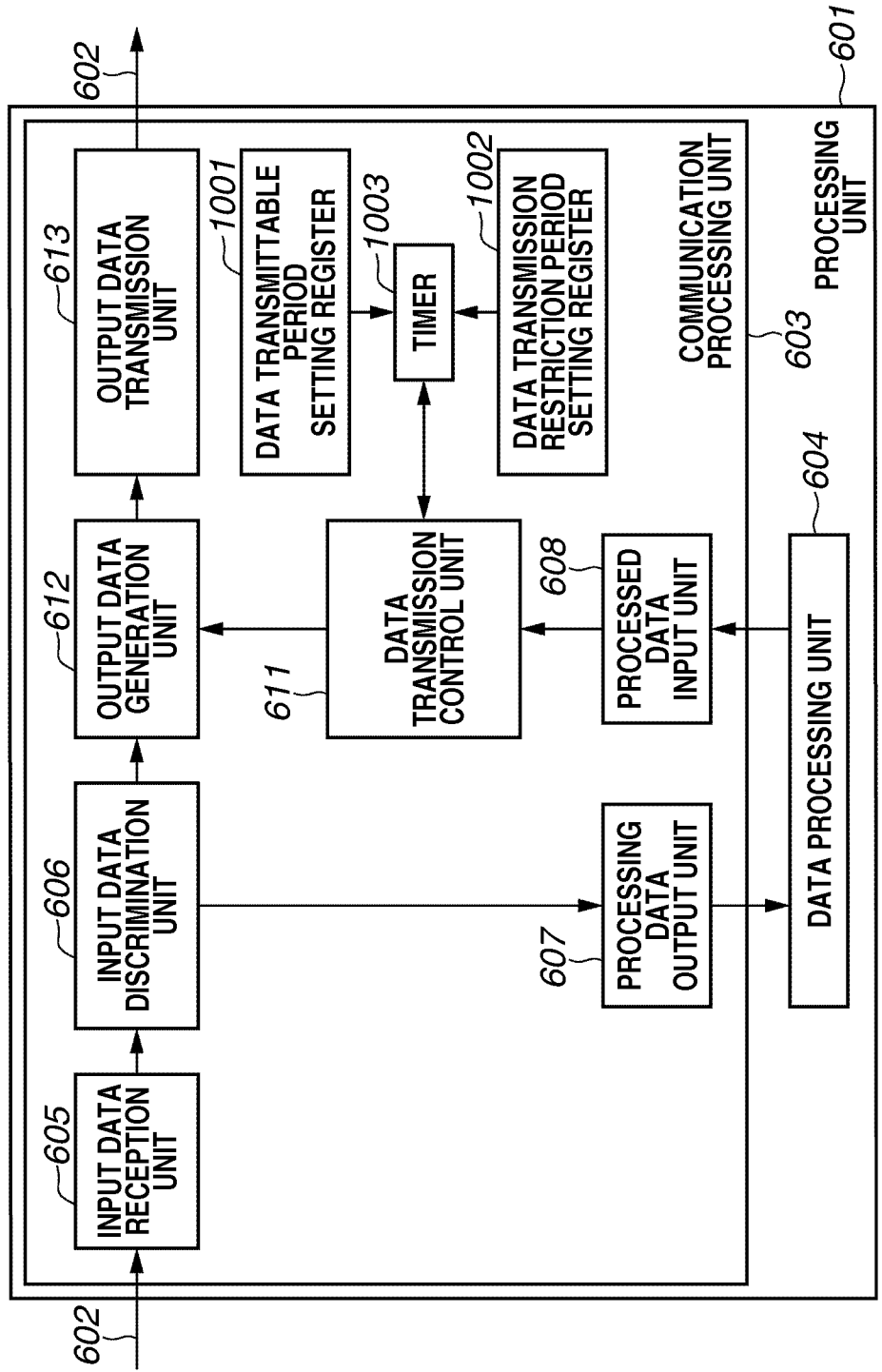
FIG. 9 illustrates a schematic configuration of the processing unit of the image processing apparatus.

FIG. 9 illustrates another exemplary embodiment of the communication processing unit. In a configuration illustrated in FIG. 9, the image processing apparatus that includes a plurality of processing units in which a time period "A" for transmitting data (equivalent to a time period for transmitting the first amount of data) and a time period "B" for restricting the transmission (equivalent to a time period for transmitting the second amount of data) are alternately repeated is described.

Components and processes which have same functions as those illustrated in FIGS. 5 and 7 are denoted in the same reference numerals. Descriptions about components and processes which have similar configurations or functions will not be repeated.

In a data transmittable time period setting register 1001, a value indicating a length of a data-transmittable time period is set. In a data transmission restriction time period setting register 1002, a value indicating a length of a restriction time period for restricting the transmission of the data is set.

A timer 1003 notifies the data transmission control unit 611 of timing for switching the transmission time period and the restriction time period based on the value of the data transmittable time period setting register 1001 and the value of the data transmission restriction time period setting register 1002. The data transmission control unit 611 repeats the transmission and the restriction of the data at a period notified by the timer 1003.

As described above, the configuration illustrated in FIG. 9 can regularly flow the data by transmitting the data at a predetermined period and supply a necessary amount of data to each data processing unit with necessary timing. When, for example, a certain data processing unit generates output data by increasing input data, the processing can be performed with a maximum efficiency if only the data can be supplied without delay after an increase of the input data is completed even if the data is not supplied when the input data is being increased. Therefore, values of the data transmittable time period setting register 1001 and the data transmission restriction time period setting register 1002 are set so that the data from the previous stage in the processing order can be supplied according to a period of the increase. With this setting, if there is a data processing unit in which an amount of the data is changed, the data can be efficiently transferred according to a change period. One example of processing for increasing the input data includes multiplication performed when the input data is the image data.

Figure 10:
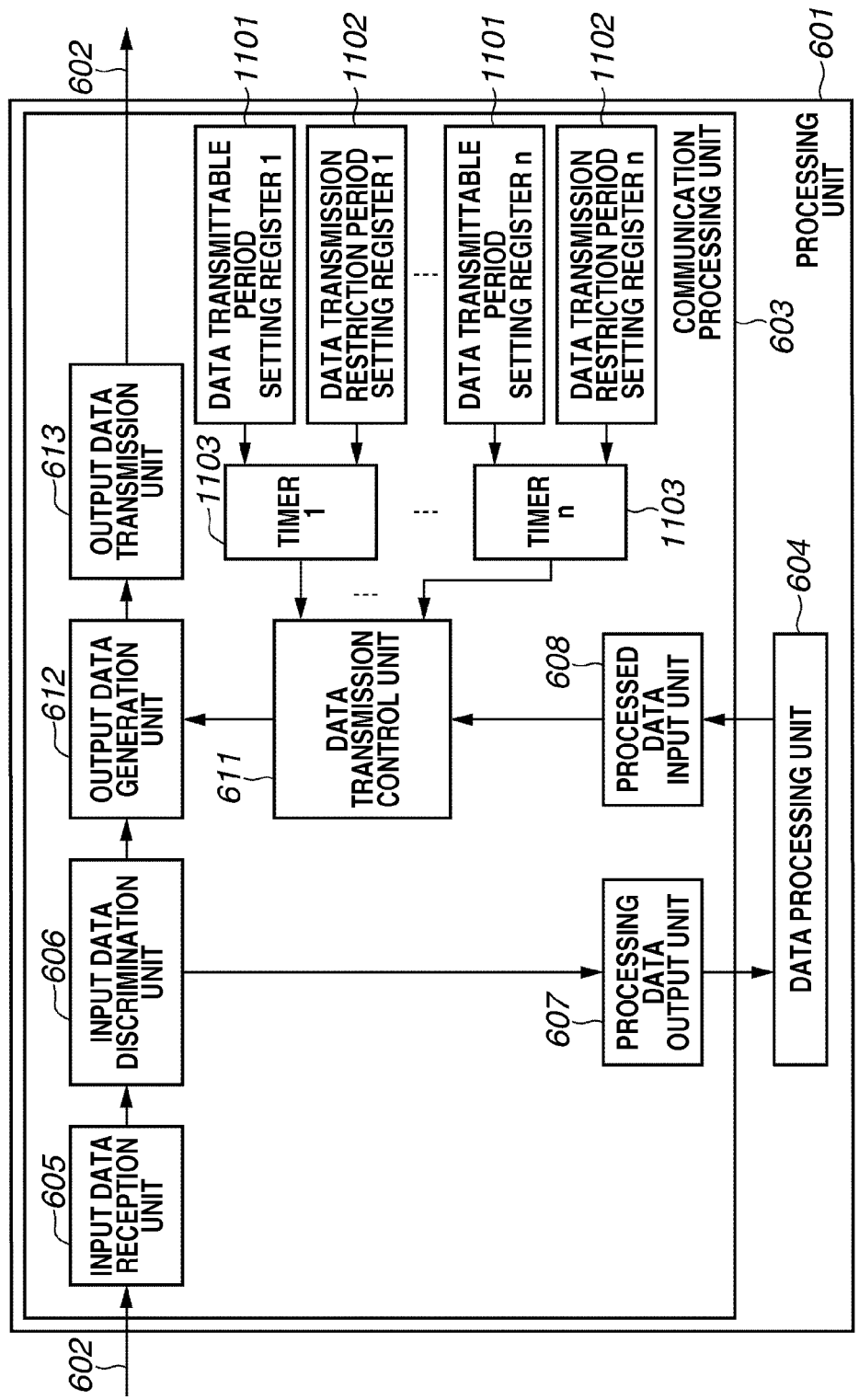
FIG. 10 illustrates a schematic configuration of the processing unit of the image processing apparatus.

As illustrated in FIG. 10, "n" sets of the data transmittable time period setting register 1101, the data transmission restriction time period setting register 1102 and the timer 1103 may be prepared. Transmission timing may be defined as time when the "n" timers indicate that the data can be transmitted. More specifically, a logical product of the "n" timers is defined as the data transmission timing.

Figure 13:
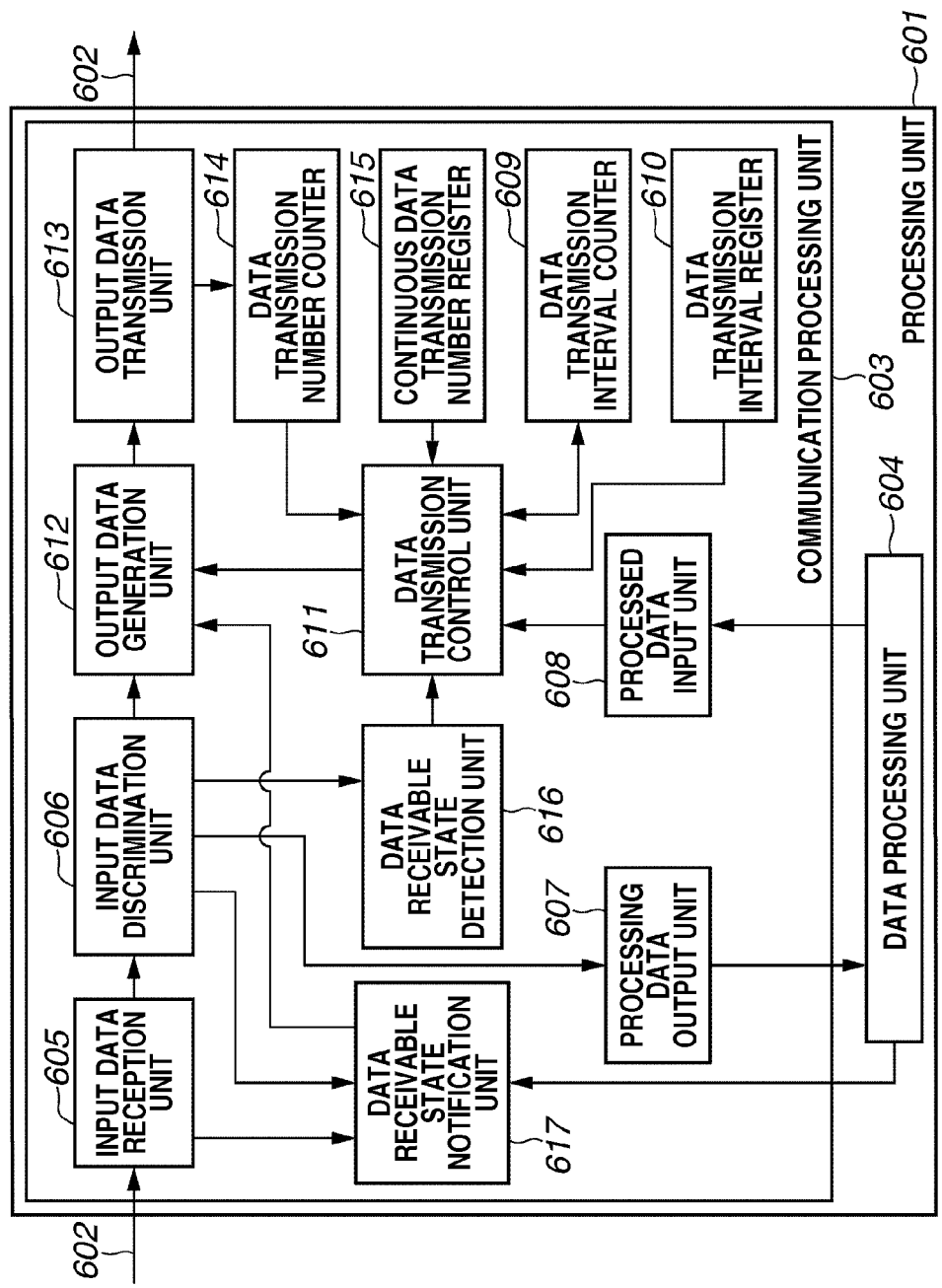
FIG. 13 illustrates another exemplary embodiment of the communication processing unit.

FIG. 13 illustrates another exemplary embodiment of the communication processing unit 603. Components and processes which have same functions as those illustrated in FIG. 5 are denoted in the same reference numerals. Descriptions about components and processes which have similar configurations or functions will not be repeated.

When the input data discrimination unit 606 determines a packet is to be processed by the own node, a data receivable state detection unit 616 detects a data receivable state of a following node which will process the data next to the node of the input data discrimination unit 606. The data receivable state detection unit 616 detects a notification of the receivable state from another node.

When the data transmission control unit 611 outputs the input data from the processed data input unit 608 to the ring bus 602, the data transmission control unit 611 controls whether to output the data based on the state detected by the data receivable state detection unit 616.

A data receivable state notification unit 617 generates a command for notifying a previous node, which processes the data before the own node, of the data receivable state of the own node. At this point, the input data discrimination unit 606 discriminates the last processed node from the received data and informs the data receivable state notification unit 617 of the last processed node as a notification destination. The output data generation unit 612 generates the transmission packet from the packet which the input data discrimination unit 606 determines not to be processed by the own node or the empty packet which the input data discrimination unit 606 determines not to include the valid data.

The output data generation unit 612 also generates the transmission packet from the data necessary for being output from the data transmission control unit 611 to the ring bus 602 or the command generated by the data receivable state notification unit 617.

The output data transmission unit 613 transmits the packet generated by the output data generation unit 612 to the ring bus 602. A data transmission number counter 614 counts a number of packets as a number of data sets which are processed by the data processing unit 604 and transmitted from the own node to the ring bus 602. A continuous data transmission number register 615 sets a number of times of sequentially transmitting the data processed by the data processing unit 604. In order to store a time period which has elapsed since the last data has been transmitted, the data transmission interval counter 609 is incremented for each cycle. The data transmission interval register 610 stores the interval between the transmissions of the data processed by the data processing unit 604.

The packet used by the data receivable state notification unit 617 for the notification of the data receivable state of the own node will be described. FIG. 2B illustrates the format of the command packet for notifying the previous node in the processing order of the data receivable state of the node of the latter stage in the processing order.

The field 206 includes the command for notifying the node in the previous stage of the data receivable state of the node in the latter stage of the processing.

Further, contents of the command in a field 702 of the command packet for notification of the data receivable state may include specific information of the data receivable state such as a number of receivable data sets and time (a number of cycles) necessary for becoming the data receivable state.

In the data processing unit, a number of data sets necessary for processing is predetermined. The number of data sets corresponds to a number of sequential data transmissions performed by the data processing unit in the previous stage of the processing and previously stored in the continuous data transmission number register 615. When the data receivable state detection unit 616 detects that the data processing unit in the latter stage of the processing becomes a data receivable state, an amount of the data sets corresponds to the number of the sequential data transmissions set to the continuous data transmission number register 615 is transmitted. At this time, the interval between the data transmissions is previously set to the data transmission interval register 610 according to the processing time of the data processing unit in the latter stage, such that the data can be received without being missed. The registers 615 and 610 may be separately included in or shared by the data processing units.

The processing of the data transmission control unit 611 will be described below referring to FIG. 14.

Figure 14:
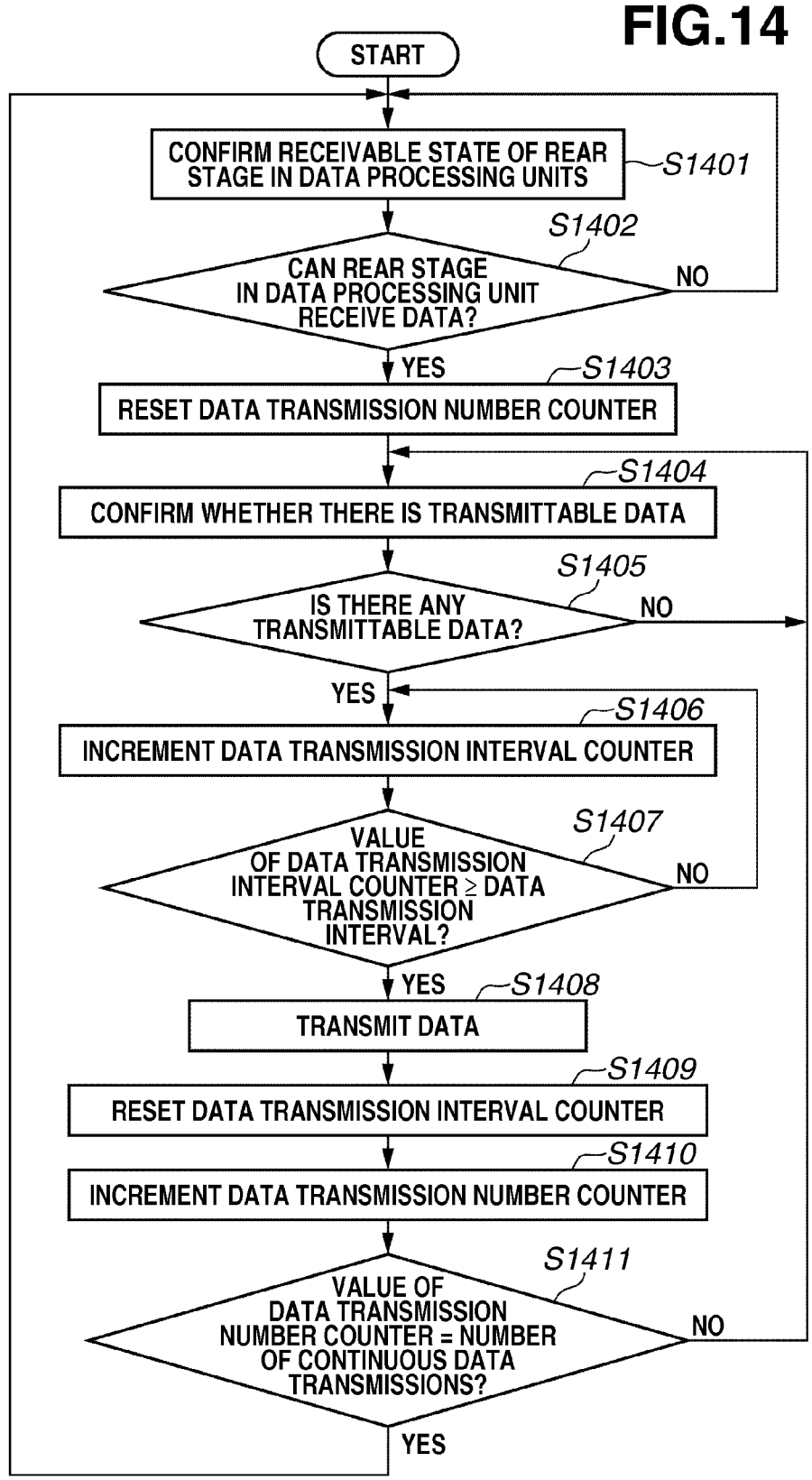
FIG. 14 is a flowchart illustrating a flow of processing performed by the communication processing unit when the configuration illustrated in FIG. 13 is used.

FIG. 14 is a flowchart illustrating the processing performed by the data transmission control unit 611 according to the first exemplary embodiment. In step S1401, the data transmission control unit 611 checks the data receivable state of the node in the latter stage of the processing detected by the data receivable state detection unit 616. In step S1402, when the state is determined not to be receivable (No in step S1402), the data transmission control unit 611 repeats the processing in steps S1401 and S1402 until the state becomes receivable. When the state is receivable (YES in step S1402), the processing proceeds to step S1403. In step S1403, the data transmission control unit 611 resets a value of the data transmission number counter 614 to zero.

In step S1404, the data transmission control unit 611 checks whether the transmittable data processed by the data processing unit 604 is input from a processed data input unit 608. In step S1405, when it is determined that there is no transmittable data (NO in step S1405), the data transmission control unit 611 repeats the processing in steps S1404 and S1405 until the transmittable data is input. When the transmittable data is input (YES in step S1405), the processing proceeds to step S1406. The data transmission control unit 611 increments the data transmission interval counter 609. In step S1407, the data transmission control unit 611 compares the interval from a last transmission (a value of the data transmission interval counter 609) with the interval (a value of the data transmission interval register 610) in which the data processing unit in the latter stage can perform processing. The data transmission control unit 611 repeats the processing in steps S1406 and S1407 until the interval from the last transmission becomes equal to or more than the interval in which the data processing unit in the latter stage can be perform processing.

When the above described condition is satisfied (YES in step S1407), the processing proceeds to step S1408. In step S1408, the data transmission control unit 611 transmits the data to the output data generation unit 612. Further the output data generation unit 612 generates the packet, and the output data transmission unit 613 transmits the generated packet to the ring bus 602.

In step S1409, the data transmission interval counter 609 is reset. In step S1410, the data transmission number counter 614 is incremented. In step S1411, the data transmission control unit 611 determines whether a value of the data transmission number counter 614 reaches that of the continuous data transmission number register 615.

When data sets corresponding to the number of times of sequential transmission of the data is not transmitted (NO in step S1411), the processing returns to step S1404, and the data transmission control unit 611 repeats the above described processing. When the data corresponding to the number of times of sequential transmission of the data is transmitted (YES in step S1411), the processing returns to step S1401 and the data transmission control unit 611 waits in step S1402 until the data processing unit in the latter stage becomes receivable.

The processing in which a certain node notifies another node in the previous stage in the processing of the data receivable state will be described below. The data receivable state notification unit 617 determines the data receivable state based on the state for receiving the packet in the input data reception unit 605 and the state for processing in the data processing unit 604. In order to notify the data receivable state with using the command, a latency until the command is detected in a notification target node in the previous stage of the processing is necessary one cycle at least and a number of cycles which is one cycle less than a latency corresponding to one circuit of the ring bus 602 at largest.

Further, until the data transmitted from the notification target node is actually received, it needs to consider that other nodes may perform the processing on the way. Thus, a total latency needs at least one circuit of the ring bus 602 including the latency for the notifying command (the latency for one circuit of the ring bus 602 corresponds to a number of cycles necessary for the data to go one circuit of the ring bus 602).

Considering the latency described above, timing for transmitting the notification command of the data receivable state may be earlier than when the node to be notified becomes the data receivable state.

However, since the processing performance is deteriorated if the received data is missed, it is desirable to set the latency after the data receivable state is notified and until the data is actually received as described below. More specifically, it is desirable that the notification of the data receivable state is performed at an upper limit of a number of cycles which is earlier than the time when the data processing unit actually becomes the data receivable state.

The processing using the image processing apparatus illustrated in FIG. 13 will be described below referring to FIGS. 15A and 15B.

Figure 15A:
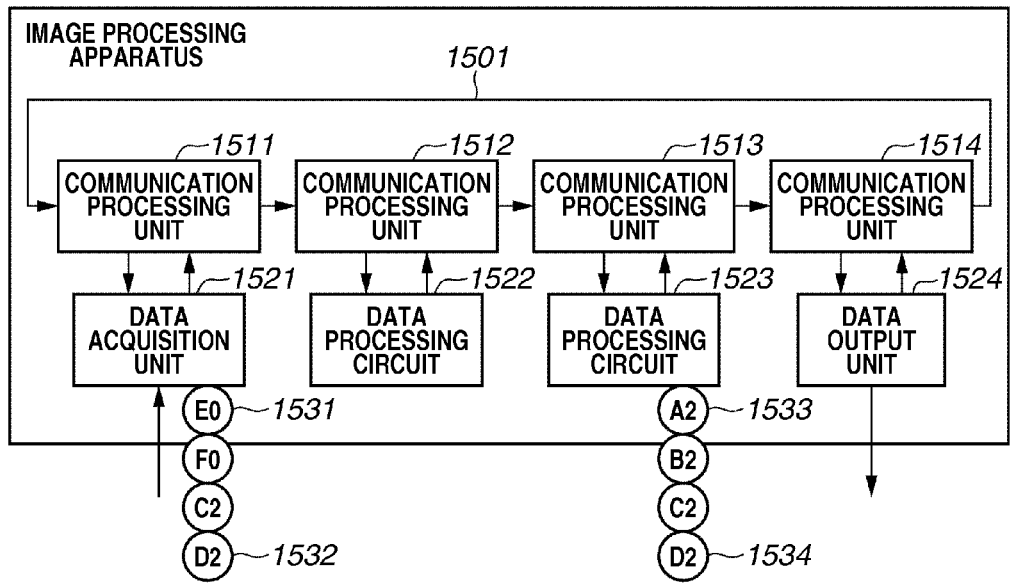
FIGS. 15A and 15B illustrate states of the processing when the configuration illustrated in FIG. 13 is used.
Figure 15B:
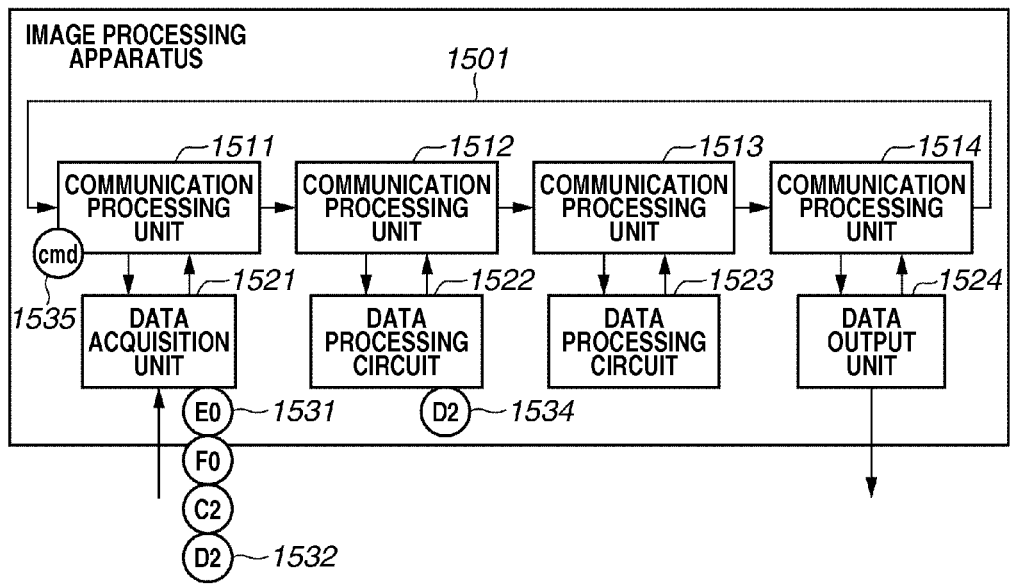

In FIGS. 15A and 15B, a data acquisition unit 1521, data processing circuits 1522 and 1523, and a data output unit 1524 are respectively connected to communication processing units 1511, 1512, 1513, and 1514. Packets 1531 to 1534 are data packets, and a packet 1535 is a command packet.

The command packet 1535 is transmitted from the communication processing unit 1513 to the communication processing unit 1511 to notify that the communication processing unit 1513 becomes receivable. At this point, the command packet also circulates in a ring bus 1501 similarly to the data packet.

In FIG. 15A, four data packets 1533 in front to 1534 are transmitted to the data processing circuit 1523 and are processed. At this point, since the communication processing unit 1511 which is the previous stage of the communication processing unit 1513 connected to the data processing circuit 1523 is waiting for the receivable command from the communication processing unit 1513, the communication processing unit 1511 restricts transmission of the data packet 1531 following to the data packet 1534.

FIG. 15B illustrates a state in which the data processing circuit 1523 completes the processing and the data processing circuit 1522 is processing the data of the data packet 1534. At this point, the command packet 1535 is received by the communication processing unit 1511 and transmission of the data packet 1531 is started.

Subsequently, four data sets from the data packet 1531 to the data packet 1532 are supplied to the data processing circuit 1523 similarly to the state illustrated in FIG. 15A. However, since the data processing circuit 1522 is processing the data packet 1534 when the data packet 1531 is transmitted, it is necessary to consider that the data packet 1531 is not to be received by the data processing circuit 1522.

On the other hand, mainly four methods described below can control an amount of the data to be transmitted by each communication processing unit to each processing unit in the latter stage. In a first method, the communication processing unit 1512 also notifies the communication processing unit 1511 of the data receivable state. In a second method, after the communication processing unit 1511 receives the command packet 1535, the data packet 1531 is not transmitted right away but transmitted after an interval of three or more cycles in which processing of the data packet 1534 is completed like other data. In a third method, timing for transmitting the command packet 1535 from the communication processing unit 1513 is adjusted. In a fourth method, the command packet 1535 includes information instructing transmission at the intervals of three cycles or more in which the processing of the data packet 1534 is completed.

In order to realize the fourth method, after the interval instructed by the command packet 1535 is spaced, the data receivable state detection unit 616 may notify the data transmission control unit 611 that the communication processing unit 1513 becomes receivable.

The above described processing can generate a similar effect even when the data processing circuit 1523 increases an amount of the data sets such that four data packets output twice data packets, namely eight data packets. In that case, similarly to the data packet 1534 illustrated in FIG. 15B, the last eighth data packet is processed by the data processing circuit 1522.

Therefore, the command packet 1535 for notifying that the communication processing unit 1513 becomes receivable is also transmitted to the communication processing unit 1511, and appropriate data is supplied from the communication processing unit 1511 according to a processing state of the communication processing unit 1513. This method can be applied not only to a case where the amount of data is increased to other than twice but also where the data is reduced.

By using the configuration illustrated in FIG. 13, the processing circuit in the latter stage of the processing can notify the previous processing circuit of the data receivable state thereof. Thus, the amount and the timing of the data which is supplied from the previous stage to the ring bus and to be processed by the node in the latter stage are adjusted to optimum. As a result, even if the amount of the data is increased in a data flow, the data from the previous stage is supplied when the data is needed in the latter stage, and the data flow can be controlled with high efficiency without wasting a capacity of the ring bus or deteriorating the performance. Further, according to the first exemplary embodiment, since a signal line separate from the ring bus does not need to be provided for notification of the data receivable state, the data processing apparatus can be decreased in size.

Figure 17:
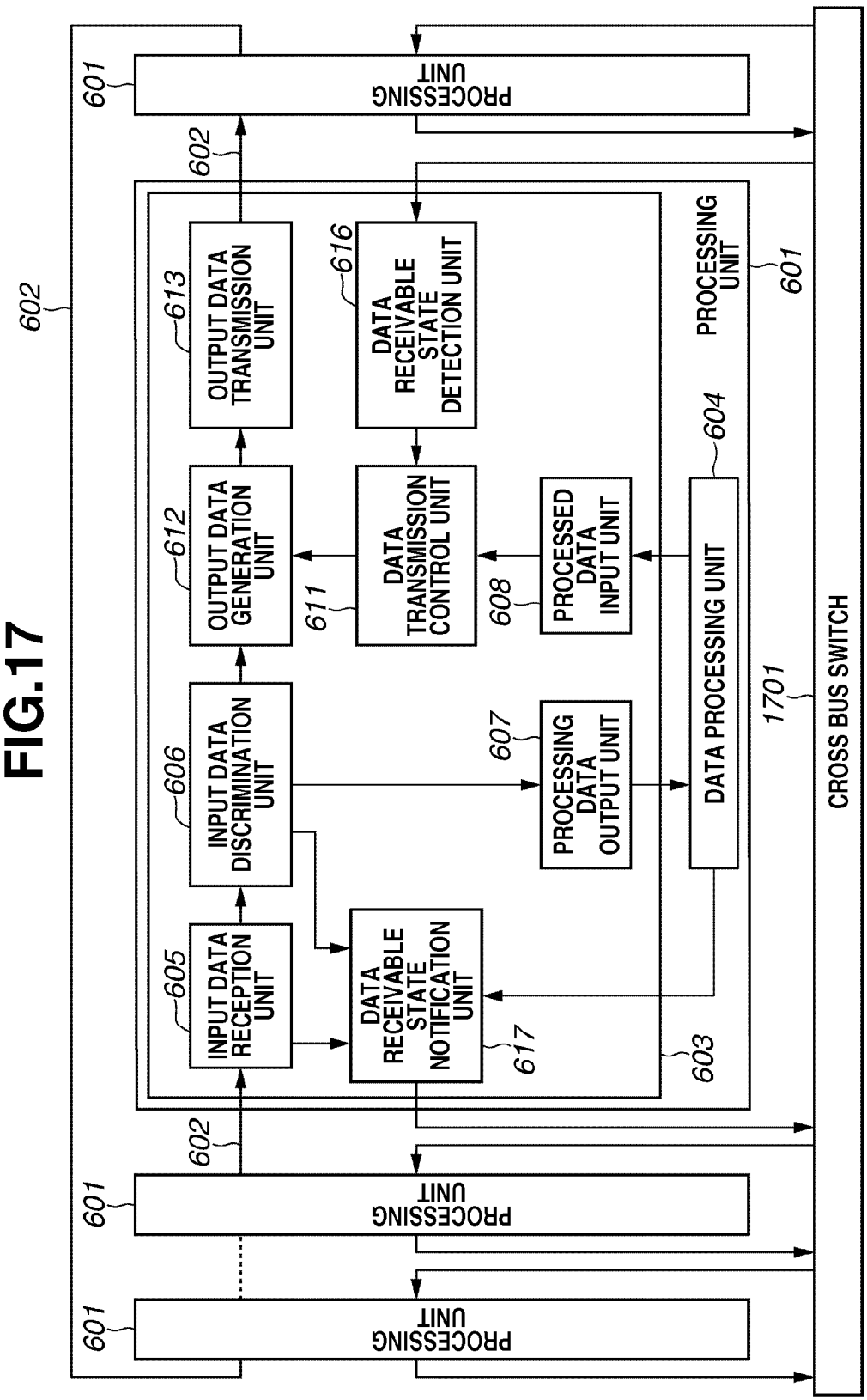
FIG. 17 illustrates another exemplary embodiment of the information processing apparatus.

As a method for notifying the processing unit of the data receivable state, a configuration illustrated in FIG. 17 may be used. In the configuration illustrated in FIG. 17, the data receivable state detection unit 616 and the data receivable state notification unit 617 in each data processing unit are directly connected with each other via a cross-bus switch 1701. The data receivable state can be notified via a signal line directly connected to the data receivable state detection unit 616 and the data receivable state notification unit 617.

As long as the data receivable state detection unit 616 and the data receivable state notification unit 617 of each data processing unit are directly connected with each other, any method other than the cross bus switch may be used.

When a connection line for notification is configured separately from the ring bus, all of the data processing units installed in the apparatus do not need to be connected to the connection line. For example, when the data processing unit provided with the data acquisition unit for supplying the data to the ring bus is connected with the data processing unit which is expected to increase the amount of data by the processing, a number of the signal lines can be decreased, and the apparatus can be efficiently controlled.

Figure 18:
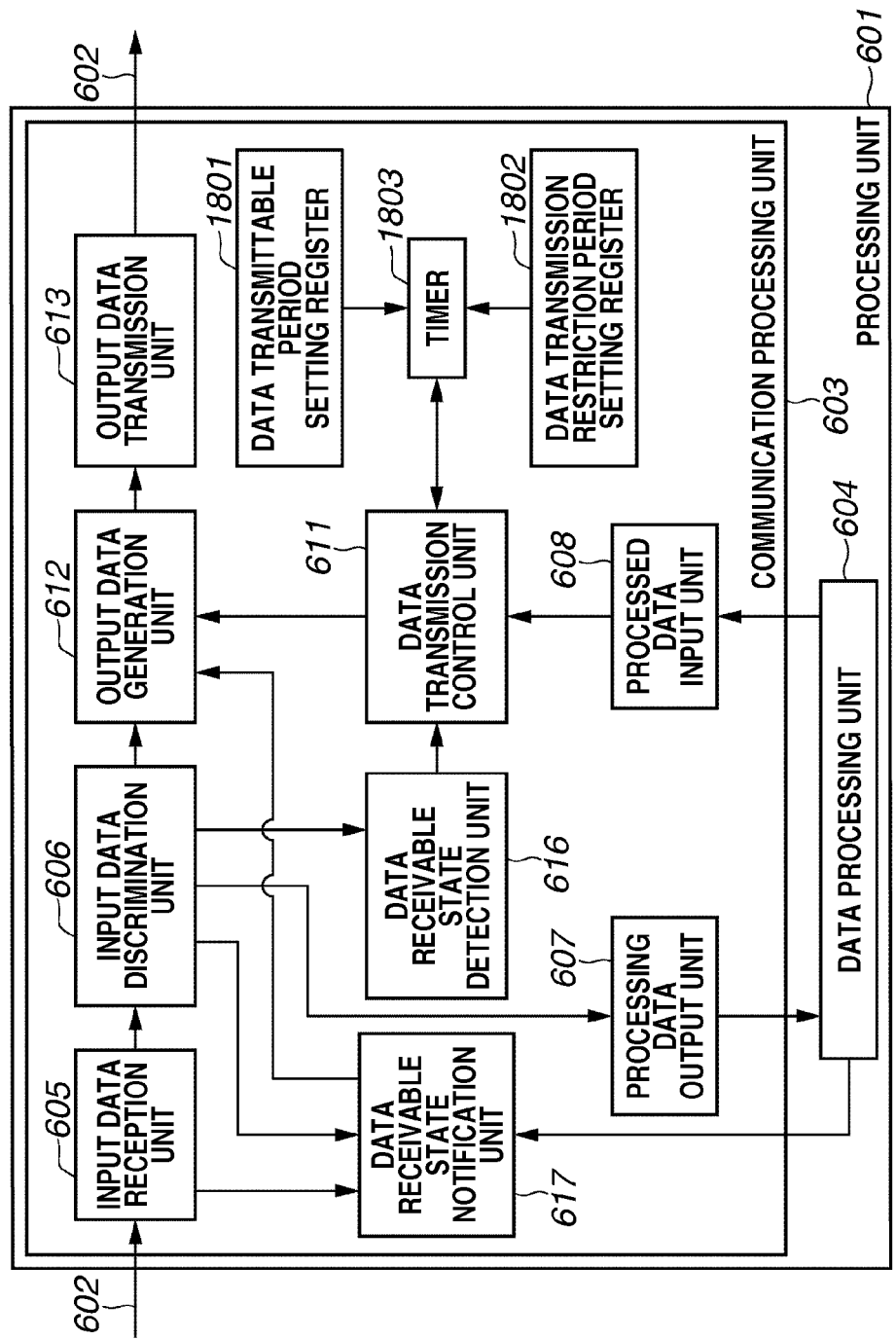
FIG. 18 illustrates another exemplary embodiment of the communication processing unit.

As another configuration of the communication processing unit 603, a configuration illustrated in FIG. 18 may be used. In the configuration illustrated in FIG. 18, when a data processing unit targeted for detection by the data receivable state detection unit 616 is in the data receivable state, a time period "A" in which the data is transmittable and a time period "B" in which the data transmission is restricted are repeatedly performed.

In FIG. 18, components and processes which have same functions as those illustrated in FIG. 5 are denoted in the same reference numerals. Descriptions about components and processes which have similar configurations or functions will not be repeated.

In FIG. 18, a data transmittable time period setting register 1801 stores information indicating the time period "A" in which the data is transmittable. A data transmission restriction period setting register 1802 stores information indicating the time period "B" in which the data transmission is restricted. A timer 1803 notifies the data transmission control unit 611 of timing for switching the time periods "A" and "B".

When the data transmittable state detection unit 616 detects that the node in the latter stage is in the data receivable state, the data transmission control unit 611 repeats the transmission of data and the restriction of the data transmission with a period notified by the timer 1803.

As described above, in the configuration illustrated in FIG. 18, the data can be transmitted at the set cycle to be regularly circulated. Further, the data receivable state is notified by the node in the latter stage, so that the data necessary for the processing can be appropriately circulated.

When the node in the latter stage is switched to the data receivable state, the timer 1803 may start counting of the time as the timer from an initial state or from a point where a last operation has been interrupted.

The time period "B" for restricting the transmission which is set in the data transmission restriction time period setting register 1802 is preferably equal to the interval in which the data processing unit 604 transmits the data to the processed data input unit 608 or longer.

Figure 16:
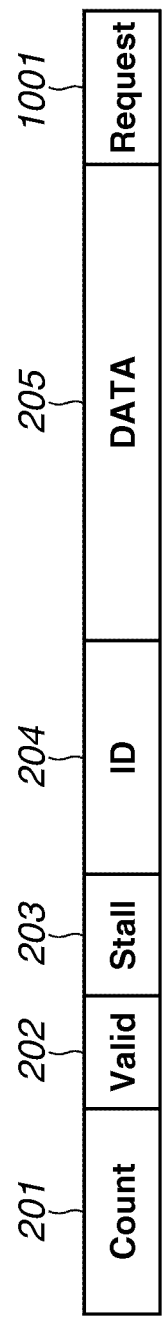
FIG. 16 illustrates another format of a packet.

As illustrated in FIG. 16, as the packet to be used for notification, a field 1001 may store a Request bit indicating the data receivable state of the data processing unit in the latter stage of the processing (e.g., "1" for receivable, "0" for non-receivable). More specifically, the input data discrimination unit 606 transmits a value of the Request bit of the valid data packet to be processed by the own node to the data receivable state detection unit 616. The data receivable state detection unit 616 determines whether the node in the latter stage is in the data receivable state based on the value of the Request bit, and the data transmission control unit 611 controls transmission of the data.

On the other hand, when the data receivable state is notified to the node in the previous stage of the processing, information notified from the data receivable state notification unit 617 is set as the value of the Request bit in the packet generation unit 612.

In the descriptions of each exemplary embodiment described above, the image processing apparatus is used as an example, however the exemplary embodiment of the present invention is not limited to the image processing but can be applied to information processing in which processing such as the pipeline processing is executed in parallel by a plurality of processing units.

The present invention is used for enabling the processing units to operate in parallel, which is not described in the above described exemplary embodiments, the present invention can be suitably adapted for a ultrahigh-speed multi-core processor. Further, when a parallel operation is performed, it is ideal to distribute load equally to each processing unit. Thus, it is desirable to divide the data input to the processing units which have an equal processing function into packets (or a predetermined amount of data sets) which have a predetermined length (bit length) by the data acquisition unit to enable processing units to perform parallel processing. When the processing of the processing units is different, the packet length (amount of data sets) may be adjusted such that a time from processing the packet by each processing unit to outputting is closer to a predetermined time.

The packet length is not regulated in each exemplary embodiment described above. However, if the packet length is set to a predetermined length, an appropriate value can be set to the transmission interval (transmission time period) in each module.

In the above described exemplary embodiments, the valid flag indicating validity of packet is used. However, a specific node ID (e.g., "0") may be defined as an invalid packet (equivalent to "0" for valid flag) to reduce the packet length.

The data acquired from an external apparatus may be input in a packet format used by the ring bus. Further, the processing unit may interpret and process the packet as it is.

The figures illustrating the schematic configurations of each unit in the data processing apparatus used in the above described exemplary embodiments are used for describing relationships for connecting the circuits or the function units, but not restricting a positional relationship or a number of the components. For example, in order to implement the present invention, three or more communication units (including input and output units) may be provided, or two or more processing units may be provided.

For example, processing modules (data processing units described above) may be formed as separate chips, or a single chip. The processing units may be formed similarly to the communication units. The configuration of the present invention may be formed as one chip.

In the above described exemplary embodiments, each of the processing modules is connected in a ring topology, however, the present invention is not limited thereto. For example, even if the processing modules are connected in a bus topology or in a mesh pattern, the present invention can be applied to all configurations in which a series of processing (pipeline processing) is divided and performed in parallel by a plurality of modules in order. Thus, transfer efficiency can be improved.

The exemplary embodiments described above only describes the setting of a single pipeline processing as an example, however, the present invention can be applied to a parallel processing unit which executes a plurality of types of pipeline processing by a time-division multiplexing method. In that case, the format of the packet may be provided with a path identifier for identifying the pipeline processing to which the packet belongs. Settings of each module maybe stored therein for each pipeline processing. A register for discriminating the input packet for discriminating the input data and a register for storing the ID to be added to the output packet need to store the ID for each pipeline processing.

Aspects of the present invention can also be realized by a computer of a system or apparatus (or devices such as a CPU or MPU) that reads out and executes a program recorded on a memory device to perform the functions of the above described embodiment (s), and by a method, the steps of which are performed by a computer of a system or apparatus by, for example, reading out and executing a program recorded on a memory device to perform the functions of the above described embodiment (s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. A data processing apparatus including a plurality of data processing units which are communicably connected to a ring shaped bus and process data in series,
   wherein each of the plurality of data processing units includes:
   a discrimination unit configured to, based on data received by the data processing unit, discriminate a one-previous data processing unit which process the data one step before the data processing unit;
   a notification unit configured to determine a receivable state of the data processing unit and notify the one-previous data processing unit discriminated by the discrimination unit of the receivable state;
   a hold unit configured to hold an interval of transmitting processed data; and
   a control unit configured to control a transmission amount of data according to a notification from the notification unit included in a one-latter data processing unit which processes the data one step later in the data processing unit,
   wherein a number of pieces of data necessary for processing data is predetermined for each of the plurality of data processing units,
   wherein the control unit is configured to store, as a sequential data transmission number, a number of pieces of data necessary for a data processing unit which processes data one step after the data processing unit to process data, and
   wherein the control unit is configured to transmit processed data based on whether the interval held by the hold unit is a value according to the sequential data transmission number in case that the control unit detects a notification that the data processing unit which processes data one step after the data processing data is in a receivable state.

2. The data processing apparatus according to claim 1, wherein the notification unit performs notification by transmitting a predetermined command to the ring shaped bus.

3. The data processing apparatus according to claim 1, wherein the notification unit performs notification by using a predetermined bit of the data to be transmitted to the ring shaped bus.

4. The data processing apparatus according to claim 1, wherein the notification unit performs notification by using a signal line which is provided separately from the ring shaped bus and directly connects the processing units.

5. The data processing apparatus according to claim 1, wherein the control unit controls a data transmission interval such that the data is transmitted at an interval in which the one-latter data processing unit which processes the data one step later in the data processing unit can receive the data.

6. The data processing apparatus according to claim 5, wherein the control unit sequentially transmits a predetermined number of data sets when it is notified that the one-latter data processing unit which processes the data one step later in the data processing unit is put in the receivable state.

7. The data processing apparatus according to claim 6, each of the data processing unit further includes a register configured to store the number of the sequential data transmissions.

8. The data processing apparatus according to claim 6, wherein the notification unit issues a notification when data corresponding to a number of sequential data transmissions which is set in a notification target data processing unit, becomes receivable.

9. The data processing apparatus according to claim 1, wherein, when the data processing unit is in the receivable state, the control unit controls the data transmission interval by repeating transmission of the data during a time period when the data can be transmitted and non-transmission of the data during a time period when the data transmission is restricted.

10. The data processing apparatus according to claim 9, further comprising a register configured to store the time period when the data can be transmitted and the time period when the data transmission is restricted.

11. The data processing apparatus according to claim 1, wherein, when the data processing unit is in the receivable state, the control unit controls the data transmission interval by transmitting the data only during a time period when transmission can be performed, for all of a plurality of time periods.

12. The data information processing apparatus according to claim 1, wherein the hold unit is a counter to count an interval from a last transmission of processed data.

13. The data information processing apparatus according to claim 12, wherein the control unit is configured to reset a count value of the hold unit to zero.

14. The data information processing apparatus according to claim 1,
wherein the discrimination unit is further configured to, based on data received by the data processing unit, discriminate whether the data should be processed, and
wherein the control unit is configured to detect whether it is notified that the data processing unit which processes data one step after the data processing unit is in the receivable state in a case that the discrimination unit discriminates that the received data should be processed by the data processing unit.

15. The data information processing apparatus according to claim 14, wherein the control unit is configured to check whether processing on the received data has been completed and the processed data is transmittable and to transmit the processed data in case that the interval held by the hold unit is a value according to the sequential data transmission number.

16. A method for processing information in a plurality of data processing units which are communicably connected in a ring shaped bus and process data in series, the method comprising:
discriminating, based on data received by the data processing unit, a one-previous data processing unit which process the data one step before the data processing unit;
determining a receivable state of the data processing unit and notifying the discriminated one-previous data processing unit of the receivable state;
holding an interval of transmitting processed data; and
controlling a transmission amount of data according to a notification from a one-latter data processing unit which processes the data one step later in the data processing unit,
wherein a number of pieces of data necessary for processing data is predetermined for each of the plurality of data processing units,
wherein in the controlling step, a number of pieces of data necessary for a data processing unit which processes data one step after the data processing unit to process data, are stored as a sequential data transmission number and
wherein in the controlling step, processed data is transmitted based on whether the interval held is a value according to the sequential data transmission number in case a notification is detected that the data processing unit which processes data one step after the data processing data is in a receivable state.

17. A computer-readable storage medium which stores a program for causing a computer to execute a method for processing information in a plurality of data processing units which are communicably connected in a ring shaped bus and process data in series, the method comprising:
discriminating, based on data received by the data processing unit, a one-previous data processing unit which process the data one step before the data processing unit;
determining a receivable state of the data processing unit and notifying the discriminated one-previous data processing unit of the receivable state;
holding an interval of transmitting processed data; and
controlling a transmission amount of data according to a notification from a one-latter data processing unit which processes the data one step later in the data processing unit,
wherein a number of pieces of data necessary for processing data is predetermined for each of the plurality of data processing units,
wherein in the controlling step, a number of pieces of data necessary for a data processing unit which processes data one step after the data processing unit to process data, are stored as a sequential data transmission number and
wherein in the controlling step, processed data is transmitted based on whether the interval held is a value according to the sequential data transmission number in case a notification is detected that the data processing unit which processes data one step after the data processing data is in a receivable state.

* * * * *